US012627031B2

(12) United States Patent
Hsu et al.

(10) Patent No.: US 12,627,031 B2
(45) Date of Patent: May 12, 2026

(54) ANTENNA MODULE

(71) Applicant: Advanced Semiconductor Engineering, Inc., Kaohsiung (TW)

(72) Inventors: Shao-En Hsu, Kaohsiung (TW); Huei-Shyong Cho, Kaohsiung (TW); Shih-Wen Lu, Kaohsiung (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 187 days.

(21) Appl. No.: 18/244,208

(22) Filed: Sep. 8, 2023

(65) Prior Publication Data

US 2025/0087887 A1 Mar. 13, 2025

(51) Int. Cl.

| | |
|---|---|
| ***H01Q 1/22*** | (2006.01) |
| ***H01Q 5/357*** | (2015.01) |
| ***H01Q 13/02*** | (2006.01) |

(52) U.S. Cl.

CPC .......... *H01Q 1/2283* (2013.01); *H01Q 5/357* (2015.01); *H01Q 13/025* (2013.01)

(58) Field of Classification Search

CPC ..... H01Q 1/2283; H01Q 5/357; H01Q 13/025

See application file for complete search history.

(56) References Cited

U.S. PATENT DOCUMENTS

| | | | | |
|---|---|---|---|---|
| 2024/0243488 A1* | 7/2024 | Ueda | ...................... | H01Q 13/02 |
| 2025/0023245 A1* | 1/2025 | Fung | .................... | H01Q 9/0414 |

FOREIGN PATENT DOCUMENTS

| | | |
|---|---|---|
| CN | 102683863 B | 11/2015 |

* cited by examiner

*Primary Examiner* — Daniel Munoz

(74) *Attorney, Agent, or Firm* — Foley & Lardner LLP

(57) ABSTRACT

An antenna module is provided. The antenna module includes a conductive structure, a first dielectric layer, and a second dielectric layer. The conductive structure defines a first space and a second space over the first space. The first dielectric layer is at least partially within the first space and has a first dielectric constant. The second dielectric layer is at least partially within the second space and has a second dielectric constant different from the first dielectric constant.

9 Claims, 18 Drawing Sheets

100A

200A

200A'

ANTENNA MODULE

BACKGROUND

1. Field of the Disclosure

The present disclosure relates to an antenna module and, in particular, a conductive structure of the antenna module.

2. Description of the Related Art

Antenna modules play an important role in wireless communication. As the frequency of the signals transmitted/received by an antenna increases in order to achieve a broader bandwidth/faster speed, the radiation loss tends to worsen. Consequently, the gain of the antenna modules will decrease and heat accumulation in the antenna modules will occur.

SUMMARY

In some embodiments, an antenna module includes a conductive structure, a first dielectric layer, and a second dielectric layer. The conductive structure defines a first space and a second space over the first space. The first dielectric layer is at least partially within the first space and has a first dielectric constant. The second dielectric layer is at least partially within the second space and has a second dielectric constant different from the first dielectric constant.

In some embodiments, an antenna module includes a conductive structure and a dielectric structure. The conductive structure defines a space. The dielectric structure is at least partially within the space and has a first structurally defined dielectric constant and a second structurally defined dielectric constant different from the first structurally defined dielectric constant.

In some embodiments, an antenna module includes a conductive structure and a dielectric structure. The conductive structure includes a first end, a second end opposite to the first end, a waveguide adjacent to the first end and a radiating opening adjacent to the second end. The dielectric structure includes a plurality of mediums within the conductive structure. The plurality of mediums are configured to transmit electromagnetic wave signals.

BRIEF DESCRIPTION OF THE DRAWINGS

Aspects of some embodiments of the present disclosure are readily understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1:
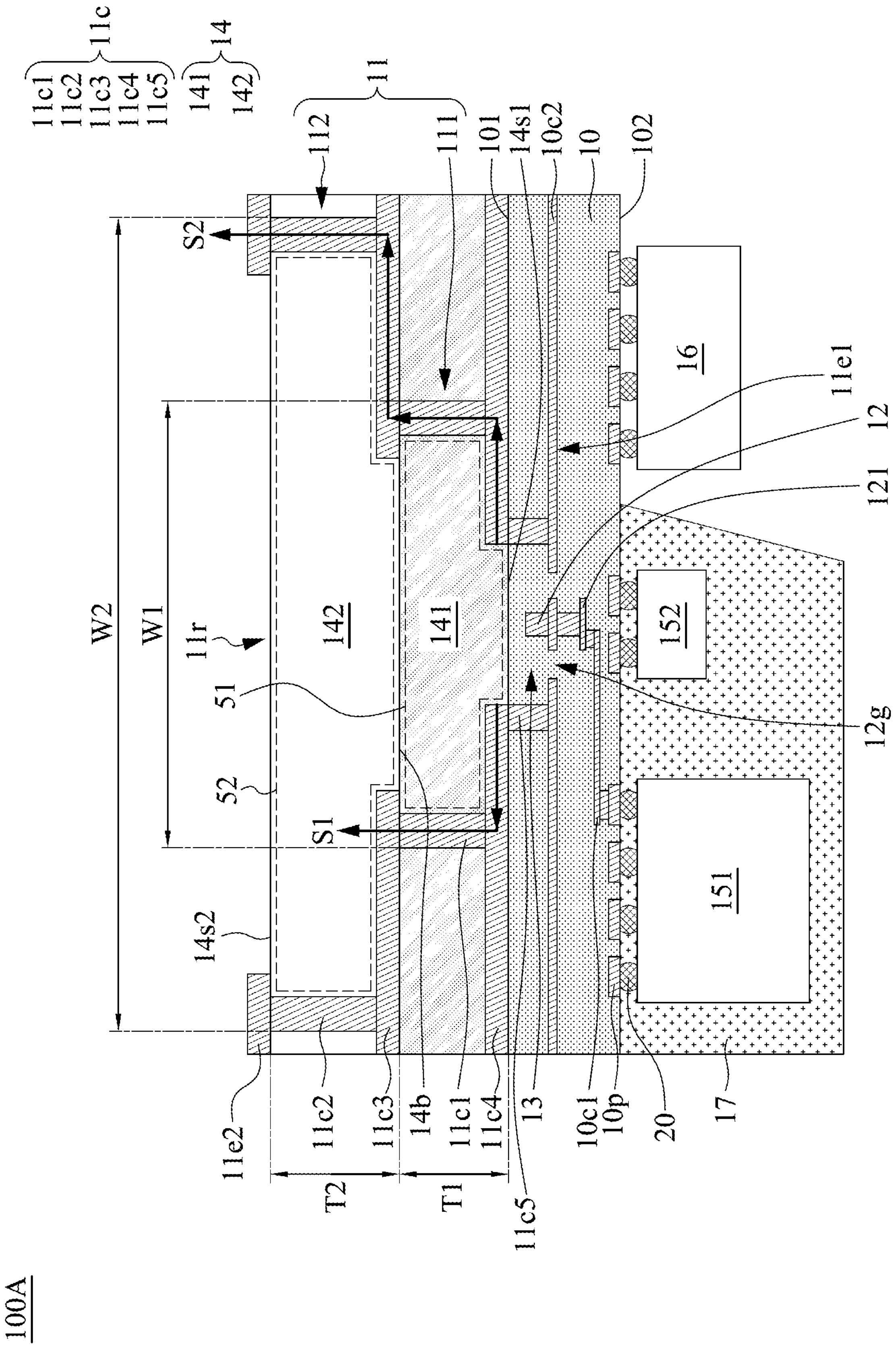
FIG. 1 illustrates a cross-sectional view of an antenna module according to some embodiments of the present disclosure.

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 illustrates a cross-sectional view of an antenna module (or an antenna device) 100A according to some embodiments of the present disclosure. The antenna module 100A may include a carrier 10, an antenna structure 11, a feeding element 12, a waveguide 13, a plurality of electronic components 151, 152, a connector 16, and an encapsulant 17. In some embodiments, the antenna module 100A may be formed by a lamination process.

The carrier 10 may be disposed under the antenna structure 11. The carrier 10 may include a circuit structure. In some embodiments, the carrier 10 may include an interposer. In some embodiments, the carrier 10 may include, for example, a printed circuit board (PCB), such as a paper-based copper foil laminate, a composite copper foil laminate, or a polymer-impregnated glass-fiber-based copper foil laminate. The carrier 10 may include a semiconductor substrate, which includes silicon or germanium in a single crystal, polycrystalline, or amorphous form. The carrier 10 may include a redistribution layer (RDL) or traces for electrical connection between components. The carrier 10 can be replaced by other suitable carriers, such as a glass carrier, a lead frame, or other suitable carriers. The carrier 10 may have a surface (or a side) 101, and a surface (or a side) 102 opposite to the surface 101. The surface 101 may also be referred to as an upper surface. The surface 102 may also be referred to as a lower surface.

The carrier 10 may be a redistribution structure. The carrier 10 may include a plurality of pads 10*p* disposed at the surface 102 of the carrier 10. The pads 10*p* may be electrically/optically connected to the electronic components 151 and/or 152. The pads 10*p* may be electrically/optically connected to the connector 16. The carrier 10 may include a plurality of conductive layers 10*c*1 and 10*c*2 disposed therein. The conductive layers 10*c*1 and 10*c*2 may include conductive vias and/or conductive traces. The conductive layer 10*c*1 may be connected to the pads 10*p*. The conductive layer 10*c*1 may be connected to the feeding element 12. The conductive layer 10*c*2 may be connected to the antenna structure 11. The conductive layer 10*c*2 may be applied with a constant voltage or connected to the ground.

The conductive layers 10*c*1 and 10*c*2 may be formed of metal or a metal alloy. The conductive layers 10*c*1 and 10*c*2 may include metal, such as copper, gold, silver, aluminum, titanium, tantalum, or the like.

The feeding element 12 may be disposed in the carrier 10. The waveguide 13 may be disposed in the carrier 10 and electrically and/or optically connected to the feeding element 12 and the antenna structure 11. The carrier 10 may include the feeding element 12 at least partially disposed within the waveguide 13. The waveguide 13 may be defined by a conductive element 11*c*5 of the conductive structure 11*c*. The waveguide 13 may be defined by the conductive element 11*c*5 and the conductive layer 10*c*2 of the carrier 10). The waveguide 13 may be filled with a semiconductor material of the carrier 10. The waveguide 13 may be semi-enclosed and has an opening facing the antenna structure 11. The feeding element 12 may have a port 121 electrically and/or optically connected to the electronic components 151 through the carrier 10. The port 121 and the conductive layer 10*c*2 may define a gap 12*g* to electrically isolate the feeding element 12 and the conductive layer 10*c*2. The gap 12*g* may be filled with a semiconductor material of the carrier 10.

The feeding element 12 may be an excitation source of radio signals. The feeding element 12 may be configured to excite radio signals to the waveguide 13. The feeding element 12 may be formed of metal or a metal alloy. The feeding element 12 may include metal, such as copper, gold, silver, aluminum, titanium, tantalum, or the like. The waveguide 13 may include semiconductor material, such as silicon, silicon dioxide, silicon nitride, or the like.

The antenna structure 11 may be disposed over the carrier 10. The antenna structure 11 and the electronic component 151 may be disposed over the opposite surfaces 101 and 102 of the carrier 10. The antenna structure 11 may include a dielectric structure 14. The dielectric structure 14 may include a plurality of mediums within the conductive structure (or surrounded by the conductive structure). The plurality of mediums may be configured to transmit or carry an electromagnetic wave signal. The plurality of mediums may have at least two dielectric constants. The dielectric structure 14 may include dielectric layer 141 and a dielectric layer 142 disposed over the dielectric layer 141. The dielectric layer 141 may have a surface (or a lower surface) 14*s*1 and the dielectric layer 142 may have a surface (or an upper surface) 14*s*2 opposite to the surface 14*s*1. The dielectric layer 141 may be connected to the dielectric layer 142. The dielectric layer 141 may be in contact with the dielectric layer 142. The dielectric layers 141 and 142 are separated dielectric layers. The dielectric layer 141 may have a first dielectric constant and the dielectric layer 142 may have a second dielectric constant different from the first dielectric constant. The second dielectric constant may be greater than the first dielectric constant. In some embodiments, the second dielectric constant may be greater than 3.5. The dielectric layer 142 may include a high dielectric constant material, such as Si, $SiO_2$, $Si_3N_4$, $Al_2O_3$, $Ta_2O_5$, $TiO_2$, $ZrO_2$, $HfO_2$, etc. In some embodiments, the first dielectric constant may be smaller than 3.5. The dielectric layer 141 may include a low dielectric constant material, such as, SiOF, SiCOH, Polyimide, porous silicon dioxide, etc.

The antenna structure 11 may be configured to transmit or receive electromagnetic waves with varied frequencies. In some embodiments, the antenna structure 11 may receive an electromagnetic wave from the feeding element 12 and transmit an associated electromagnetic wave to the external environment. In some embodiments, the antenna structure 11 may receive an electromagnetic wave from the external environment and transmit an associated electromagnetic wave to the feeding element 12. In some embodiments, the electronic component 151 may be configured to transmit or receive a signal through the antenna structure 11, the carrier 10, the feeding element 12, and/or the waveguide 13.

The antenna structure 11 may include a conductive structure (or a radiating element) 11*c*. The carrier (or the redistribution structure) 10 may support the conductive structure 11*c*. The conductive structure 11*c* may include a first end 11*e*1 and a second end 11*e*2 opposite to the first end 11*e*1. The first end 11*e*1 may face the carrier 10. The conductive structure 11*c* may include the waveguide 13 adjacent to the first end 11*e*1. The conductive structure 11*c* may include a radiating opening 11*r* adjacent to the second end 11*e*2. The radiating opening 11*r* may configured to adjust the impedance of the antenna structure 11. The antenna structure 11 may be configured to transmit or receive a signal through the radiating opening 11*r*. The width of the radiating opening 11*r* may be defined by the conductive structure 11*c* (e.g., a conductive element 11*c*2).

The conductive structure 11*c* may include conductive elements 11*c*1, 11*c*2, 11*c*5, and conductive layers 11*c*3, 11*c*4. The conductive elements 11*c*1, 11*c*2, and 11*c*5 are substantially perpendicular to the surface 101 of the carrier 10. The conductive layers 11$c$3 and 11$c$4 are substantially parallel to the surface 101 of the carrier 10. The conductive layer 11$c$3 electrically connects the conductive element 11$c$1 with the conductive element 11$c$2. The conductive element 11$c$2 and the conductive layer 11$c$3 are covered or encapsulated by the dielectric layer 142. The conductive layer 11$c$4 electrically connects the conductive element 11$c$1 with the conductive element 11$c$5. The conductive element 11$c$5 electrically connects the conductive layer 11$c$4 with the conductive layer 10$c$2 of the carrier 10. The conductive element 11$c$1 and the conductive layer 11$c$4 are covered or encapsulated by the dielectric layer 141. The conductive structure 11$c$ may define spaces. For example, the conductive element 11$c$1 and the conductive layer 11$c$4 may define a space (or a first space) 51. The dielectric layer 141 is at least partially within the space 51. For example, the conductive element 11$c$2 and the conductive layer 11$c$3 may define a space (or a second space) 52. The dielectric layer 142 is at least partially within the space 52. The second space 52 is over the space 51. The second space is larger than the first space. The first space 51 is between the second space 52 and the waveguide 13. The dielectric layer 141 may be surrounded by the conductive element 11$c$1. The dielectric layer 142 may be surrounded by the conductive element 11$c$2. The conductive layers 11$c$3 and 11$c$4 and the conductive elements 11$c$1 and 11$c$2 may define a plurality of steps around the first space 51 and the second space 52 in a cross-sectional view. The conductive structure 11$c$ may have a horn shape. The conductive structure 11$c$ may be part or the whole of a horn antenna. In some embodiments, the conductive structure 11$c$ may have a taper shape. In some embodiments, the conductive elements 11$c$1 and 11$c$2 may be applied with a constant voltage or connected to the ground through the conductive layer 10$c$2.

The conductive elements 11$c$1, 11$c$2, and 11$c$5 and the conductive layers 11$c$3, 11$c$4 and may be referred to as a corrugated conductive structure. The conductive element 11$c$1 may include a conductive via through (or passing through, extending through) the dielectric layer 141. The conductive element 11$c$2 may include a conductive via through (or passing through, extending through) the dielectric layer 142. The conductive elements 11$c$1, 11$c$2, and 11$c$5 and the conductive layers 11$c$3, 11$c$4 may be formed of metal or a metal alloy. The conductive elements 11$c$1, 11$c$2, and 11$c$5 and the conductive layers 11$c$3, 11$c$4 may include metal, such as copper, gold, silver, aluminum, titanium, tantalum, or the like.

The antenna structure 11 may include a region (or a frequency operation region) 111 and a region (or a frequency operation region) 112 over the frequency operation region 111. The frequency operation region 111 may be closer to the feeding element 12 or the waveguide 13 than the frequency operation region 112. The frequency operation region 111 may include the dielectric layer 141 and the conductive element 11$c$1. The frequency operation region 112 may include the dielectric layer 142 and the conductive element 11$c$2. The frequency operation region 112 may have a width W2 greater than a width W1 of the frequency operation region 111 in a direction parallel to the surface 14$s$1 of the dielectric layer 141. The frequency operation region 111 may configured to operate in a first frequency. The first frequency may be a single frequency, a frequency band, or a bandwidth. A signal S1 (e.g., an electromagnetic wave) with a relatively high frequency (or a relatively small wavelength) may be radiated by the frequency operation region 111 with the relatively small width W1. The frequency operation region 111 may be referred to as a high frequency operation region. The frequency operation region 112 may configured to operate in a second frequency different from the first frequency. The second frequency may be a single frequency, a frequency band, or a bandwidth. A signal S2 (e.g., an electromagnetic wave) with a relatively low frequency (or a relatively large wavelength) may be radiated by the frequency operation region 112 with the relatively large width W1. The frequency operation region 112 may be referred to as a low frequency operation region.

The frequency operation region 111 may have a thickness T1 in a direction perpendicular to the surface 14$s$1 of the dielectric layer 141. The frequency operation region 112 may have a thickness T2 in a direction perpendicular to the surface 14$s$1 of the dielectric layer 141. The thickness T1 of the frequency operation region 111 may be greater than the thickness T2 of the frequency operation region 112. Given that the dielectric layer 142 has the high dielectric constant, the equivalent thickness of the dielectric layer 142 for electromagnetic waves is larger than the thickness T2. Therefore, the frequency operation region 112 with the relatively small thickness T2 can be operated in a relatively low frequency (e.g., relatively large wavelength). In some embodiments, the thickness T2 may be two times smaller than the thickness T1. The size (e.g., the Z-height) of the antenna module 100A can be relatively small.

The relationship of the thickness T1 and T2 is explanatory and would not delimited the present disclosure, as long as the dielectric layer 142 has the high dielectric constant for the purpose of reducing the thickness T2 of the frequency operation region 112. In some embodiments, the material of the dielectric layer 142 may not include high dielectric constant. In such case, the frequency operation region 112 may have a thickness substantially the same or larger than that of the frequency operation region 111.

The dielectric layer 141 and the dielectric layer 142 may be heterogeneous. The dielectric layer 141 and the dielectric layer 142 define a boundary 14$b$ therebetween. An incident angle of a wave (e.g., an electromagnetic wave) from the dielectric layer 142 at the boundary 14$b$ is different from a refraction angle of the wave at the boundary 14$b$. The refraction angle of the wave is smaller than the incident angle, such that the energy of the wave in the frequency operation region 111 (or the dielectric layer 141) is concentrated. As such, the gain of the frequency operation region 111 (or the high frequency response of the antenna module 100A) can be increased. In other words, the transmission loss thereof can be improved, which in turn increases the transmission distance and reduces the power of the antenna module 100A. Furthermore, the heat generated by the transmission loss can be diminished.

In some cases, an antenna includes a high frequency operation region and a low frequency operation region over the high frequency operation region. The horn antenna may have air or a single dielectric layer disposed in both of the operation regions. It is required that the thickness of the low frequency operation region is sufficient (e.g., larger than the high frequency operation region) to operate at a low frequency (i.e., large wavelength). Therefore, the size (e.g., the Z-height) of the horn antenna cannot keep up with the ongoing trend of shrinking wireless communication technology. According to the antenna module 100A of the present disclosure, the dielectric layer 142 with the high dielectric constant enables the frequency operation region 112 with the relatively small thickness T2 to operate at a low frequency. Furthermore, different dielectric layers 141 and 142 form the boundary 14$b$ to concentrate the electromagnetic wave in the frequency operation region 111, such that the gain of the frequency operation region 111 can be increased.

The antenna structure 11, the feeding element 12, and the waveguide 13 may form a waveguide antenna. The waveguide antenna may be electrically and/or optically connected to the electronic components 151, 152, and the connector 16.

The electronic component 151 may be disposed under the carrier 10. The electronic component 151 may be disposed over the surface 102 of the carrier 10. The electronic component 151 may be separated from the conductive structure 11*c* by the carrier (or the redistribution structure). The electronic component 151 may be signally connected to the carrier 10. The electronic component 151 may be electrically connected to the waveguide 13 through the carrier 10. The electronic component 151 may be electrically connected to the carrier 10 by a plurality of solders 20. In other embodiments, the electronic component 151 may be electrically connected to the carrier 10 through wire bond or other suitable conductive elements. The electronic component 151 may be optically connected to the carrier 10. The electronic component 151 may include active components. The active components may be used to inject power into a circuit, and control or amplify signals, which may include time-varying voltage, current, electromagnetic waves, photons, or other signals. The electronic component 151 may include input/outputs (I/O) terminals, which may be used to receive and send signals, respectively. In some embodiments, the electronic component 151 may include a semiconductor die or a chip, such as a logic die (e.g., system-on-a-chip (SoC), central processing unit (CPU), graphics processing unit (GPU), application processor (AP), microcontroller, etc.), a memory die (e.g., dynamic random access memory (DRAM) die, static random access memory (SRAM) die, etc.), a power management die (e.g., power management integrated circuit (PMIC) die), a radio frequency (RF) die, a sensor die, a micro-electro-mechanical-system (MEMS) die, a signal processing die (e.g., digital signal processing (DSP) die), a front-end die (e.g., analog front-end (AFE) dies) or other active components.

The electronic component 152 may be disposed under the carrier 10. The electronic component 152 may be disposed over the surface 102 of the carrier 10. The electronic component 152 may be separated from the conductive structure 11*c* by the carrier (or the redistribution structure). The electronic component 152 may be signally connected to the carrier 10. The electronic component 152 may be electrically connected to the waveguide 13 through the carrier 10. The electronic component 152 may be electrically connected to the carrier 110 by the solders 20. The electronic component 152 may be configured to use or store energy. The electronic component 152 may be configured to adjust a signal of an output of the electronic component 151. The electronic component 152 may be configured to adjust a power signal of the electronic component. The electronic component 152 may be configured to stabilize a voltage of the output of the electronic component 151. The electronic component 152 may be configured to adjust a data signal of the electronic component 152. The electronic component 152 may be configured to filter the data signal. For example, the electronic component 152 may serve as a filter, a coupler, an oscillator, etc. In some embodiments, the electronic component 152 may include a capacitor, a resistor, an inductor or another passive component.

The connector 16 may be disposed under the carrier 10. The connector 16 may be disposed over the surface 102 of the carrier 10. The connector 16 may include a board to board connector or a hotbar. In some embodiments, the connector 16 may be configured to signally couple to an external component (not shown). In some embodiments, the connector 16 may be configured to signally couple to the electronic component 151. The connector 16 may be electrically and/or optically coupled to the electronic component 151 by the solders 20. The solders 20 may include optical bumps or electrical bumps. The connector 16 may be electrically and/or optically coupled to the electronic component 151 through the carrier 10. In some embodiments, the connector 16 may be configured to signally couple to the electronic component 152. The connector 16 may be electrically and/or optically coupled to the electronic component 152. The connector 16 may be electrically and/or optically coupled to the electronic component 152 through the carrier 10. In some embodiments, the connector 16 may be configured to signally couple to the waveguide antenna included in the antenna structure 11, the feeding element 12, and the waveguide 13. The connector 16 may be electrically and/or optically coupled to the waveguide antenna. The connector 16 may be electrically and/or optically coupled to the waveguide antenna through the carrier 10.

Figure 2:
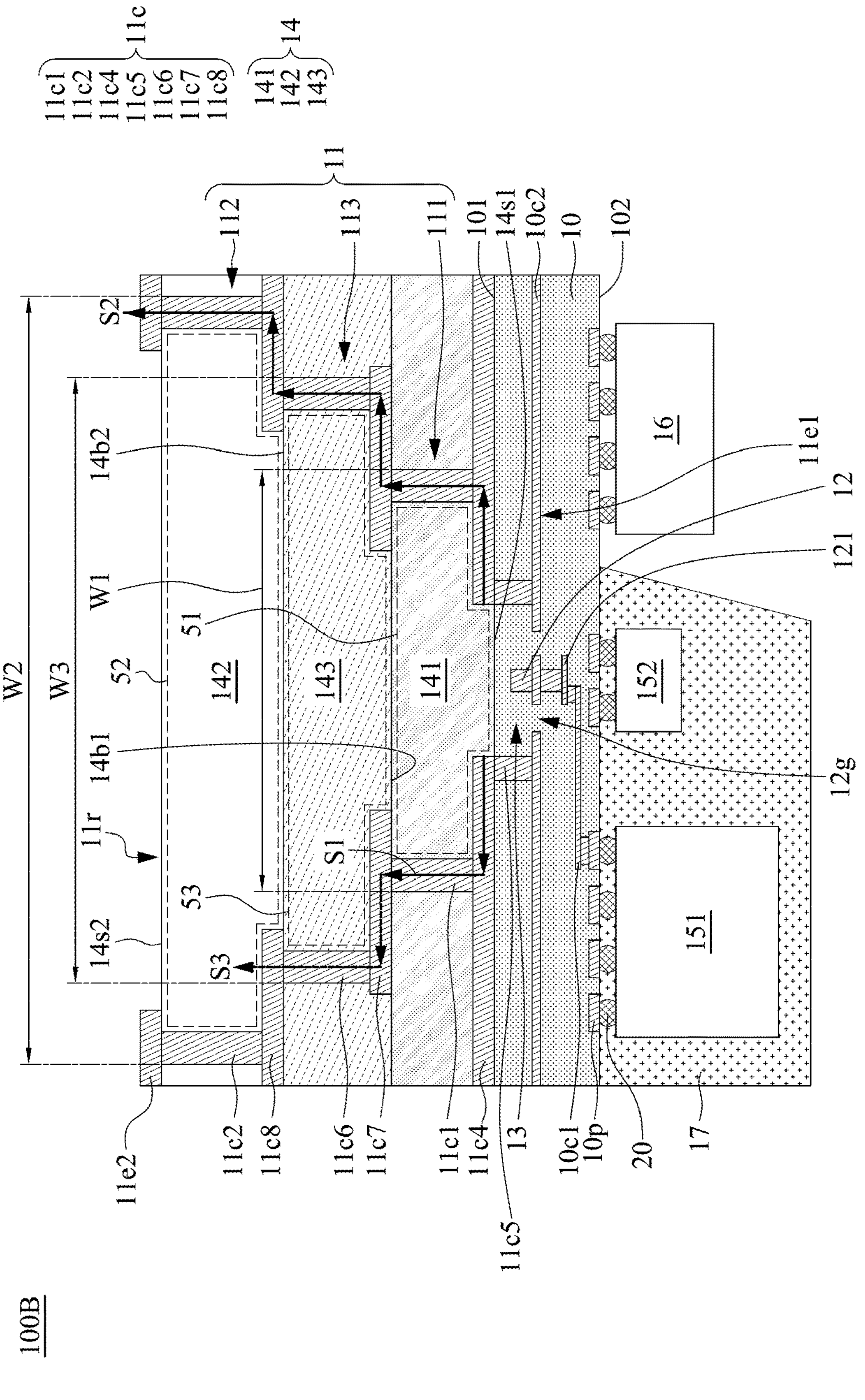
FIG. 2 illustrates a cross-sectional view of an antenna module according to some embodiments of the present disclosure.

FIG. 2 is a cross-sectional view of an antenna module 100B in accordance with some embodiments of the present disclosure. The antenna module 100B in FIG. 2 is similar to the antenna module 100A in FIG. 1. Therefore, some detailed descriptions may refer to corresponding preceding paragraphs and are not repeated hereinafter for conciseness, with differences therebetween as follows.

The antenna structure 11 may further include a dielectric layer 143 disposed between the dielectric layers 141 and 142. The dielectric layer 143 may have a third dielectric constant greater than the first dielectric constant and smaller than the second dielectric constant. The conductive structure 11*c* may include a conductive element 11*c*6, and conductive layers 11*c*7, 11*c*8, rather than the conductive layer 11*c*3. The conductive element 11*c*6 is substantially perpendicular to the surface 101 of the carrier 10. The conductive layers 11*c*8 and 11*c*7 are substantially parallel to the surface 101 of the carrier 10. The conductive element 11*c*5 electrically connects the conductive element 11*c*6 with the conductive element 11*c*2. The conductive layer 11*c*7 electrically connects the conductive element 11*c*6 with the conductive element 11*c*1. The conductive element 11*c*511*c*8 is covered or encapsulated by the dielectric layer 142. The conductive element 11*c*6 and the conductive layer 11*c*7 are covered or encapsulated by the dielectric layer 143. The conductive element 11*c*6 may define a space filled by the dielectric layer 143. The space defined by the conductive element 11*c*6 is between the spaces defined by the conductive elements 11*c*1 and 11*c*2. The space defined by the conductive element 11*c*6 is larger than the space defined by the conductive element 11*c*1 and smaller than the space defined by the conductive element 11*c*2. The dielectric layer 143 may be surrounded by the conductive element 11*c*6. The conductive structure 11*c* may have a step-shape defined by the conductive elements 11*c*1, 11*c*2, 11*c*6, and the conductive layers 11*c*7, 11*c*8. In some embodiments, the conductive element 11*c*6 may be applied with a constant voltage or connected to the ground through the conductive layer 10*c*2.

The conductive elements 11*c*1, 11*c*2, 11*c*5, and 11*c*6 and the conductive layers 11*c*3, 11*c*4, and 11*c*7 may be referred to as a corrugated conductive structure. The conductive elements 11*c*1, 11*c*2, 11*c*5, and 11*c*6 and the conductive layers 11*c*3, 11*c*4, and 11*c*7 may be formed of metal or a metal alloy. The conductive elements 11*c*1, 11*c*2, 11*c*5, and 11*c*6 and the conductive layers 11*c*3, 11*c*4, and 11*c*7 may include metal, such as copper, gold, silver, aluminum, titanium, tantalum, or the like.

The antenna structure 11 of the antenna module 100B may further include a region (or a frequency operation region) 113 between the frequency operation regions 111 and 112. The frequency operation region 113 may include the dielectric layer 143 and the conductive element 11*c*6. The frequency operation region 113 may have a width W3 between the width W1 of the frequency operation region 111 and the width W2 of the frequency operation region 112. The frequency operation region 113 is configured to operate in a third frequency between the first frequency and the second frequency. The third frequency may be a single frequency, a frequency band, or a bandwidth. A signal S3 (e.g., an electromagnetic wave) with a frequency between the signals S1 and S2 respectively transmitted by the frequency operation regions 111 and 112 may be radiated by the frequency operation region 113 with the width W3. The frequency operation region 113 may be referred to as a medium frequency operation region.

The antenna structure 11 of the antenna module 100B may include more frequency operation regions, e.g., more than 3. Each of the multiple frequency operation regions may operate at a different frequency. For example, each of the multiple frequency operation regions may transmit or receive a signal (e.g., an electromagnetic wave) from the external environment or the feeding element 12. The antenna structure 11 may include more dielectric layers. The multiple dielectric layers have different dielectric constants. Depending on the operational frequency of each of the multiple frequency operation regions, each of the frequency operation region may include one of the multiple dielectric layers. For example, the higher frequency operation region may include a dielectric layer with a higher dielectric constant, such that the higher frequency operation region can have a relatively small height. The conductive structure 11*c* of the antenna structure 11 of antenna module 100B may include more conductive structures. Each of the conductive structures may define a space filled by the corresponding dielectric layer. Each of the multiple dielectric layers may be surrounded by the corresponding conductive structures.

With the additional frequency operation region 113, the antenna module 100B may operate over a wider range of frequencies, resulting in a broader bandwidth. Furthermore, the dielectric layers 141 and 143 form a boundary 14*b*1 to concentrate the electromagnetic wave in the frequency operation region 111, such that the gain of the frequency operation region 111 can be increased. The dielectric layers 142 and 143 form a boundary 14*b*2 to concentrate the electromagnetic wave in the medium frequency operation region 113, such that the gain of the frequency operation region 113 can be increased. The antenna module 100B may provide at least similar or identical technical effects to those of the antenna module 100A.

Figure 3:
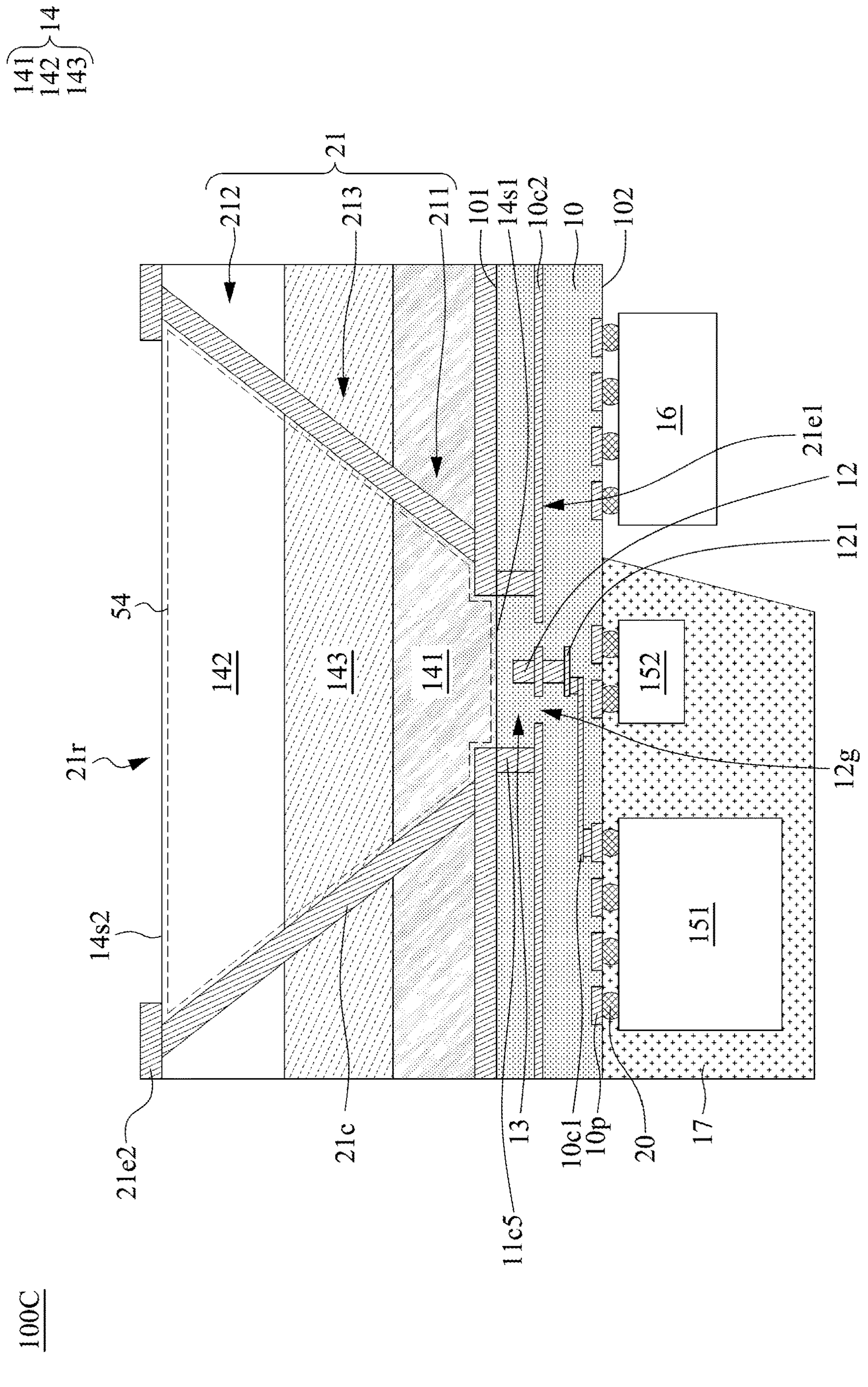
FIG. 3 illustrates a cross-sectional view of an antenna module according to some embodiments of the present disclosure.

FIG. 3 illustrates a cross-sectional view of an antenna module 100C according to some embodiments of the present disclosure. The antenna module 100C in FIG. 3 is similar to the antenna module 100B in FIG. 2. Therefore, some detailed descriptions may refer to corresponding preceding paragraphs and are not repeated hereinafter for conciseness, with differences therebetween as follows.

The antenna module 100C may include an antenna structure 21. The antenna structure 21 may include a conductive structure 21*c*. The conductive structure 21*c* may include a single conductive structure. The conductive structure 21*c* may define a space 54. The dielectric layers 141, 142, and 143 may be at least partially within the space 54.

The conductive structure 21*c* may have a taper profile in a cross-sectional view. The conductive structure 21*c* may be tapered toward the carrier 10. The antenna structure 21 may include the dielectric layers 141, 142, and 143. The conductive structure 21*c* may define a space 54. The dielectric layers 141, 142, and 143 may be at least partially within the space 54. The dielectric layers 141, 142, and 143 may be surrounded by the conductive structure 21*c*.

The conductive structure 21*c* may be formed of metal or a metal alloy. The conductive structure 21*c* may metal, such as copper, gold, silver, aluminum, titanium, tantalum, or the like.

The antenna structure 21 may include a plurality of frequency operation regions 211, 212, and 213. The frequency operation region 212 may be over the frequency operation regions 211 and 213. The frequency operation region 213 may be between the frequency operation regions 211 and 212. Each of the frequency operation regions 211, 212, and 213 may include a portion of the conductive structure 21*c*. The frequency operation regions 211, 212, and 213 may include the dielectric layers 141, 142, and 143, respectively. The frequency operation regions 211, 212, and 213 may be defined by the arrangement of the dielectric layers 141, 142, and 143. The frequency operation regions 211, 212, and 213 may be referred to as high, low, and medium frequency operation regions, respectively.

Each of the frequency operation regions 211, 212, and 213 may have varied widths and may be able to operate at varied frequencies. The antenna module 100C may operate over a wider range of frequencies, resulting in a broader bandwidth. The antenna module 100C may provide at least similar or identical technical effects to those of the antenna modules 100A and 100B.

Figure 4:
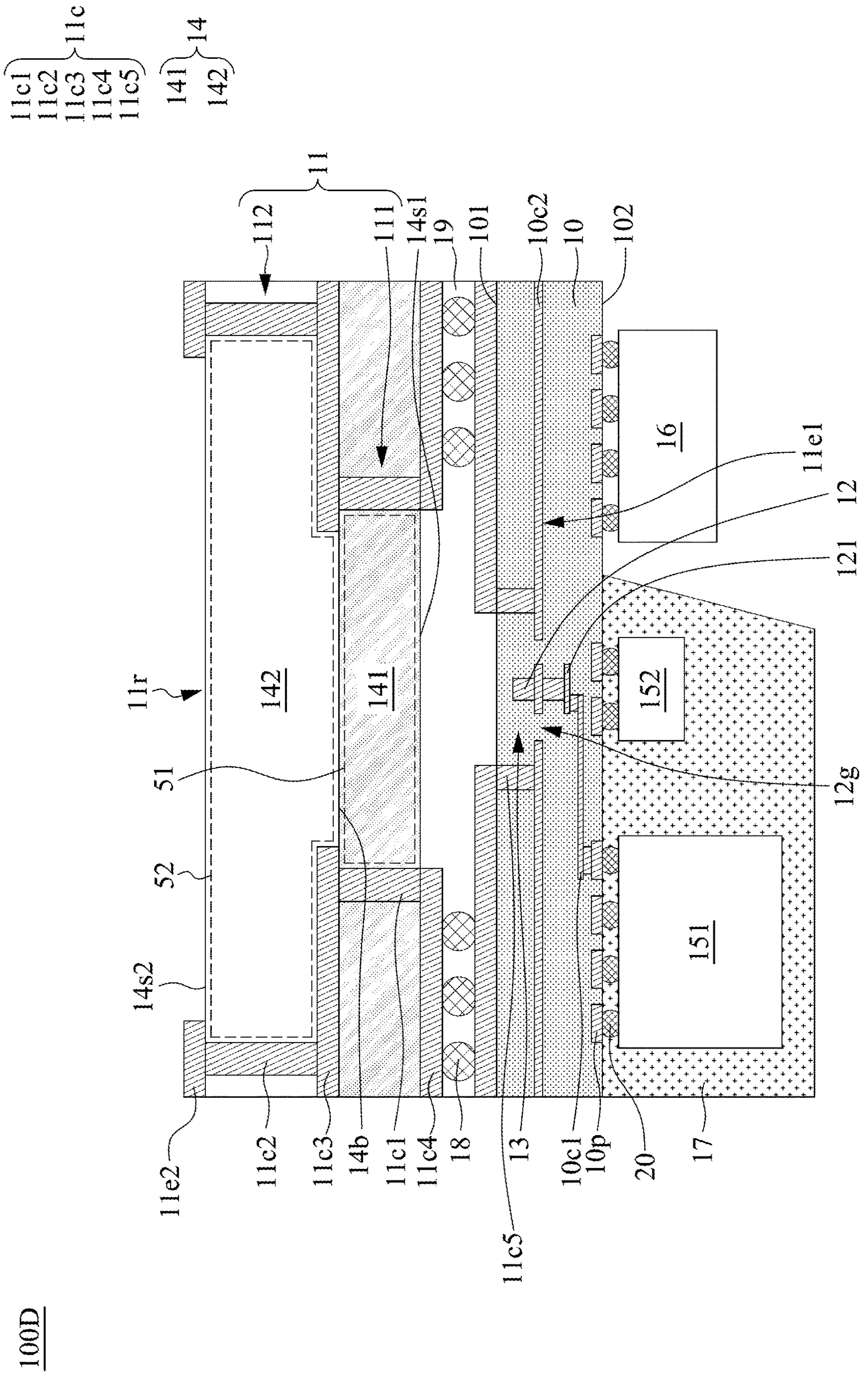
FIG. 4 illustrates a cross-sectional view of an antenna module according to some embodiments of the present disclosure.

FIG. 4 illustrates a cross-sectional view of an antenna module 100D according to some embodiments of the present disclosure. The antenna module 100D in FIG. 4 is similar to the antenna module 100A in FIG. 1. Therefore, some detailed descriptions may refer to corresponding preceding paragraphs and are not repeated hereinafter for conciseness, with differences therebetween as follows.

The antenna module 100D may further include a plurality of connection elements 18 disposed between the antenna structure 11 and the carrier 10. The antenna structure 11 (or the conductive structure 11*c*) may be electrically connected to the conductive layer 10*c*2 of the carrier 10 through the connection elements 18. The antenna module 100D may further include an encapsulant 19 encapsulating the connection elements 18. The encapsulant 19 may be disposed between the antenna structure 11 and the carrier 10. The encapsulant 19 may be in contact with the dielectric layer 141. The encapsulant 19 may include an underfill. The encapsulant 19 may be material that has a dielectric constant that smaller than that of the dielectric layer 141. An incident angle of a wave (e.g., an electromagnetic wave) from the dielectric layer 141 at the surface 14*s*1 is different from a refraction angle of the wave at the surface 14*s*1. The refraction angle of the wave is smaller than the incident angle, such that the energy of the wave in the encapsulant 19 is concentrated.

In some embodiments, the connection elements 18 may include solder balls, controlled collapse chip connection (C4) bumps, a ball grid array (BGA), or a land grid array (LGA). In some embodiments, the encapsulant 19 may include an epoxy resin including fillers, a molding compound (e.g., an epoxy molding compound or another molding compound), polyimide, a phenolic compound or material, a material including silicone dispersed therein, or a combination thereof.

Figure 5:
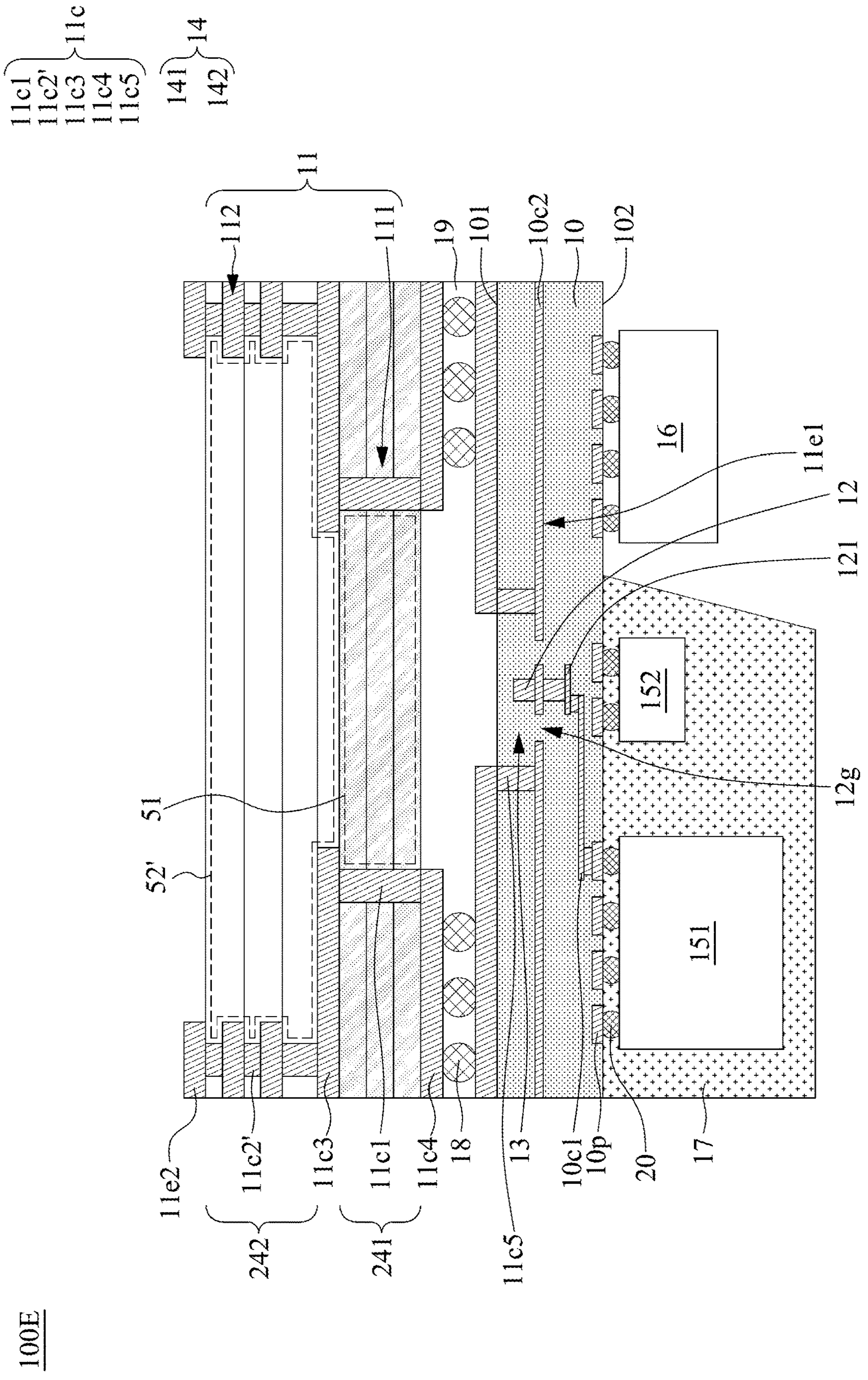
FIG. 5 illustrates a cross-sectional view of an antenna module according to some embodiments of the present disclosure.

FIG. 5 illustrates a cross-sectional view of an antenna module 100E according to some embodiments of the present disclosure. The antenna module 100E in FIG. 5 is similar to the antenna module 100D in FIG. 4. Therefore, some detailed descriptions may refer to corresponding preceding paragraphs and are not repeated hereinafter for conciseness, with differences therebetween as follows.

The antenna structure 11 of the antenna module 100E may include a laminated dielectric layer 241 and a laminated dielectric layer 242 disposed over the laminated dielectric layer 241. The laminated dielectric layers 241 and 242 may each include a plurality of dielectric layers. The dielectric layers of the laminated dielectric layer 241 may have the same dielectric constant. In some embodiments, the dielectric layers of the laminated dielectric layer 241 may have varied dielectric constants. The dielectric layers of the laminated dielectric layer 242 may have the same dielectric constant. In some embodiments, the dielectric layers of the laminated dielectric layer 242 may have varied dielectric constants. The equivalent dielectric constant of the laminated dielectric layer 242 may be greater than that of the laminated dielectric layer 241. Owing to the limitation of the equipment, the laminated dielectric layer 241 or 242 may be formed in multiple process steps. Furthermore, the conductive structure 11*c* may include a conductive element 11*c*2' surrounding the laminated dielectric layer 242. The conductive element 11*c*2' may have a repeating combination of conductive layers and conductive vias. The laminated dielectric layer 241 or 242 may include buffer layers or adhesive layers (not shown) disposed between two dielectric layers, such that the dielectric constants of the layers in the laminated dielectric layers 241 or 242 may be varied.

Figure 6:
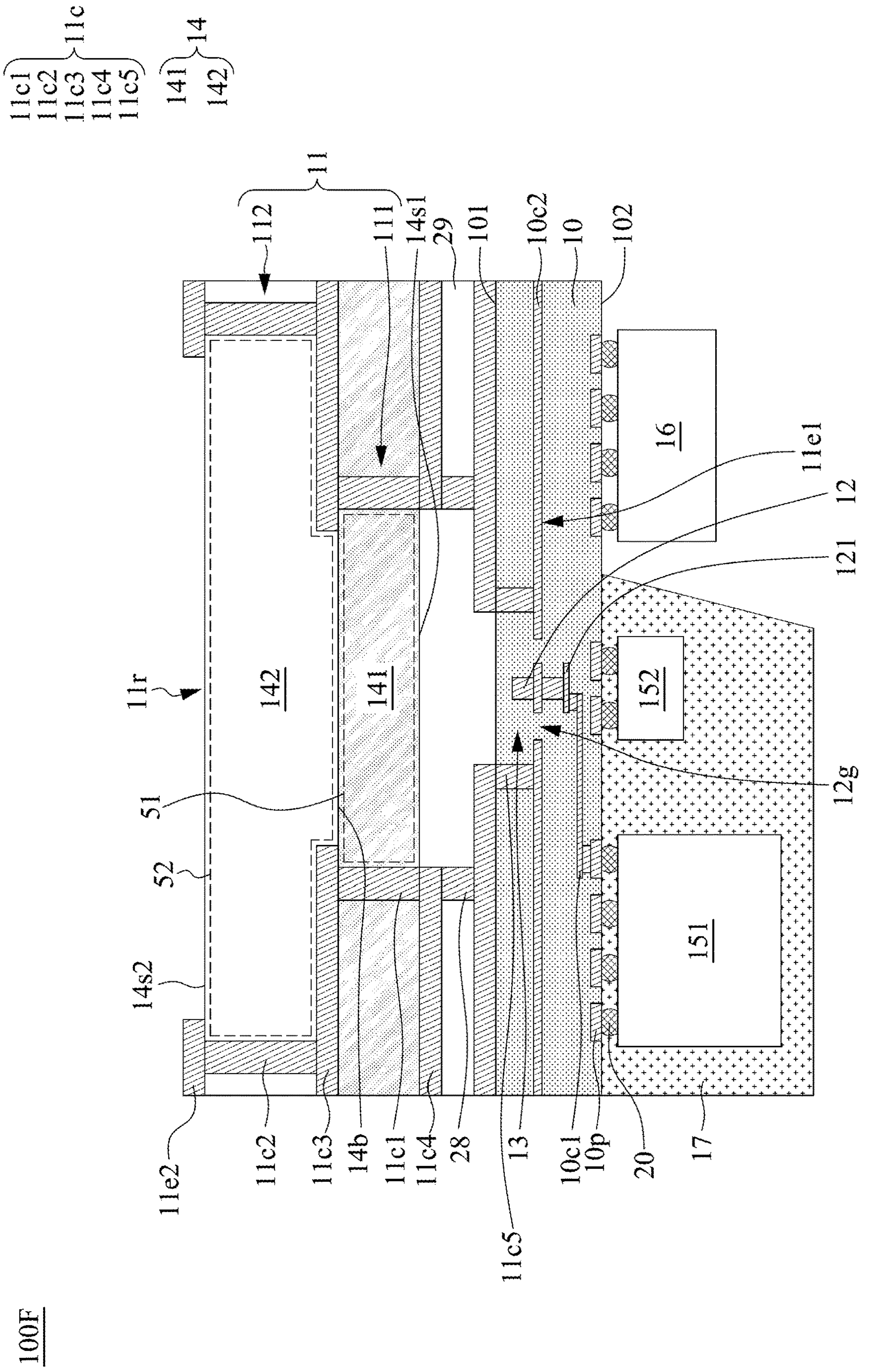
FIG. 6 illustrates a cross-sectional view of an antenna module according to some embodiments of the present disclosure.

FIG. 6 illustrates a cross-sectional view of an antenna module according to some embodiments of the present disclosure. The antenna module 100F in FIG. 6 is similar to the antenna module 100A in FIG. 1. Therefore, some detailed descriptions may refer to corresponding preceding paragraphs and are not repeated hereinafter for conciseness, with differences therebetween as follows.

The antenna module 100F may further include a plurality of conductive pillars 28 and an adhesive layer 29 disposed between the antenna structure 11 and the carrier 10. The antenna structure 11 (or the conductive structure 11*c*) may be electrically connected to the conductive layer 10*c*2 of the carrier 10 through the conductive pillars 28. The adhesive layer 29 may enclose the conductive pillars 28. The adhesive layer 29 may be in contact with the dielectric layer 141.

In some embodiments, the conductive pillars 28 may be formed of metal or a metal alloy. The conductive pillars 28 may include metal, such as copper, gold, silver, aluminum, titanium, tantalum, or the like. The adhesive layer 29 may be electrically isolated but thermally conductive. In some embodiments, the adhesive layer 29 may include silicone, wax, polymer, or other suitable materials.

Figure 7:
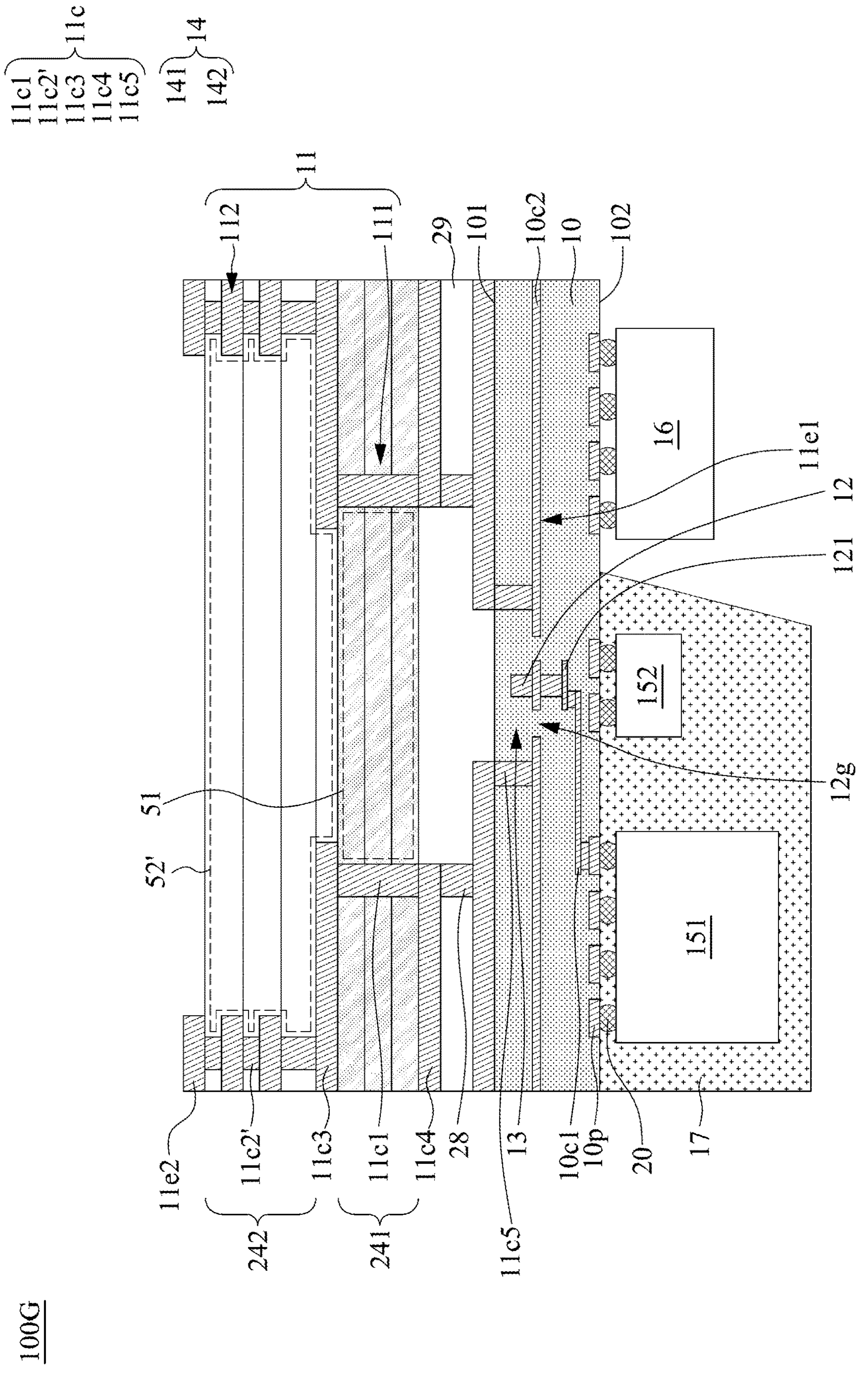
FIG. 7 illustrates a cross-sectional view of an antenna module according to some embodiments of the present disclosure.

FIG. 7 illustrates a cross-sectional view of an antenna module 100G according to some embodiments of the present disclosure. The antenna module 100G in FIG. 7 is similar to the antenna module 100F in FIG. 6. Therefore, some detailed descriptions may refer to corresponding preceding paragraphs and are not repeated hereinafter for conciseness, with differences therebetween as follows.

The antenna structure 11 of the antenna module 100G may include a laminated dielectric layer 241 and a laminated dielectric layer 242 disposed over the laminated dielectric layer 241. The laminated dielectric layers 241 and 242 may each include a plurality of dielectric layers. The dielectric layers of the laminated dielectric layer 241 may have the same dielectric constant. In some embodiments, the dielectric layers of the laminated dielectric layer 241 may have varied dielectric constants. The dielectric layers of the laminated dielectric layer 242 may have the same dielectric constant. In some embodiments, the dielectric layers of the laminated dielectric layer 242 may have varied dielectric constants. The equivalent dielectric constant of the laminated dielectric layer 242 may be greater than that of the laminated dielectric layer 241. Owing to the limitation of the equipment, the laminated dielectric layer 241 or 242 may be formed in multiple process steps. Furthermore, the conductive structure 11*c* may include a conductive element 11*c*2' surrounding the laminated dielectric layer 242. The conductive element 11*c*2' may define a space filled by the laminated dielectric layer 242. The conductive element 11*c*2' may have a repeating combination of conductive layers and conductive vias. The laminated dielectric layer 241 or 242 may include buffer layers or adhesive layers (not shown) disposed between two dielectric layers, such that the dielectric constants of the layers in the laminated dielectric layers 241 or 242 may be varied.

Figure 8:
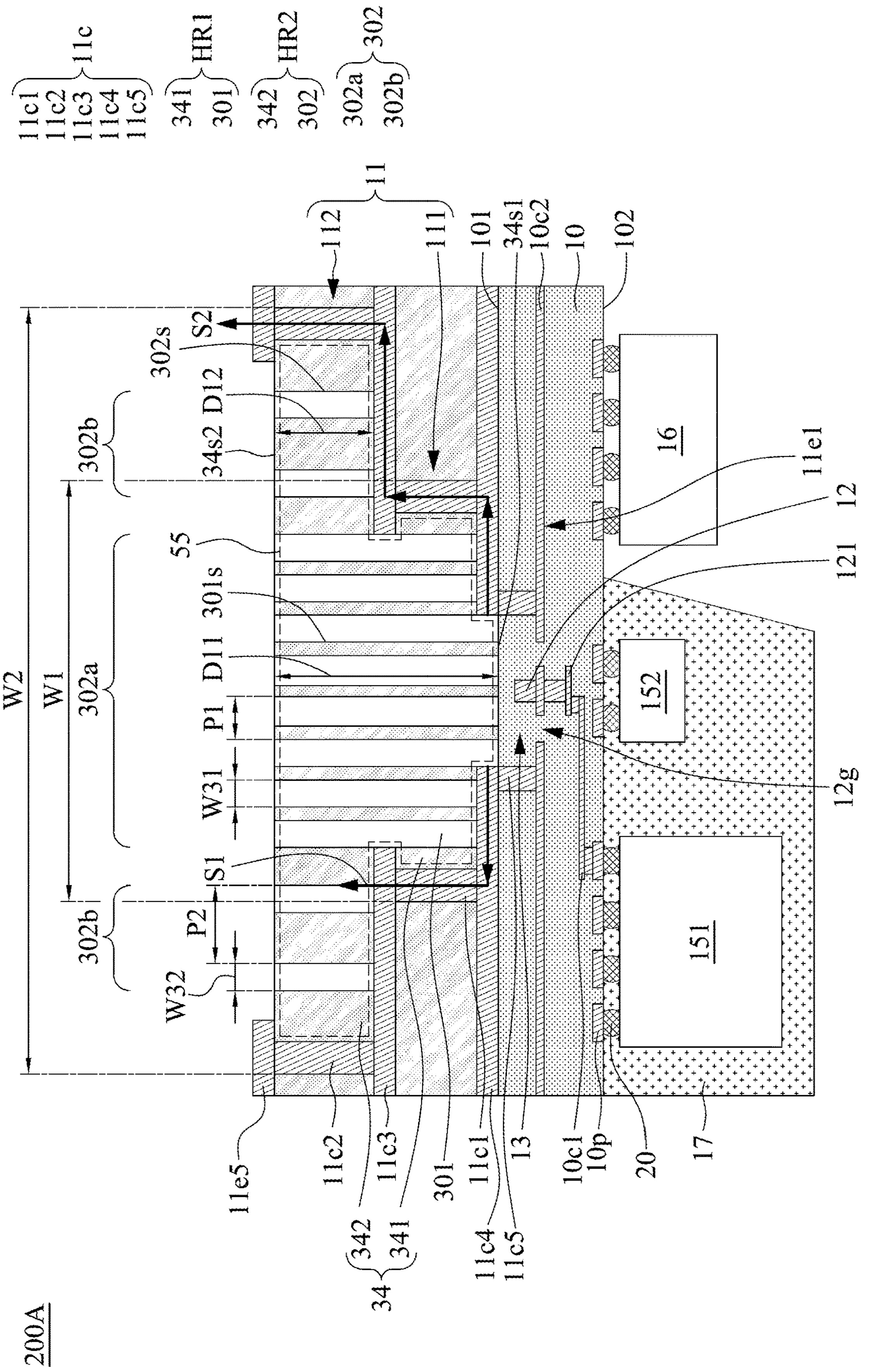
FIG. 8 illustrates a cross-sectional view of an antenna module according to some embodiments of the present disclosure.
Figure 8A:
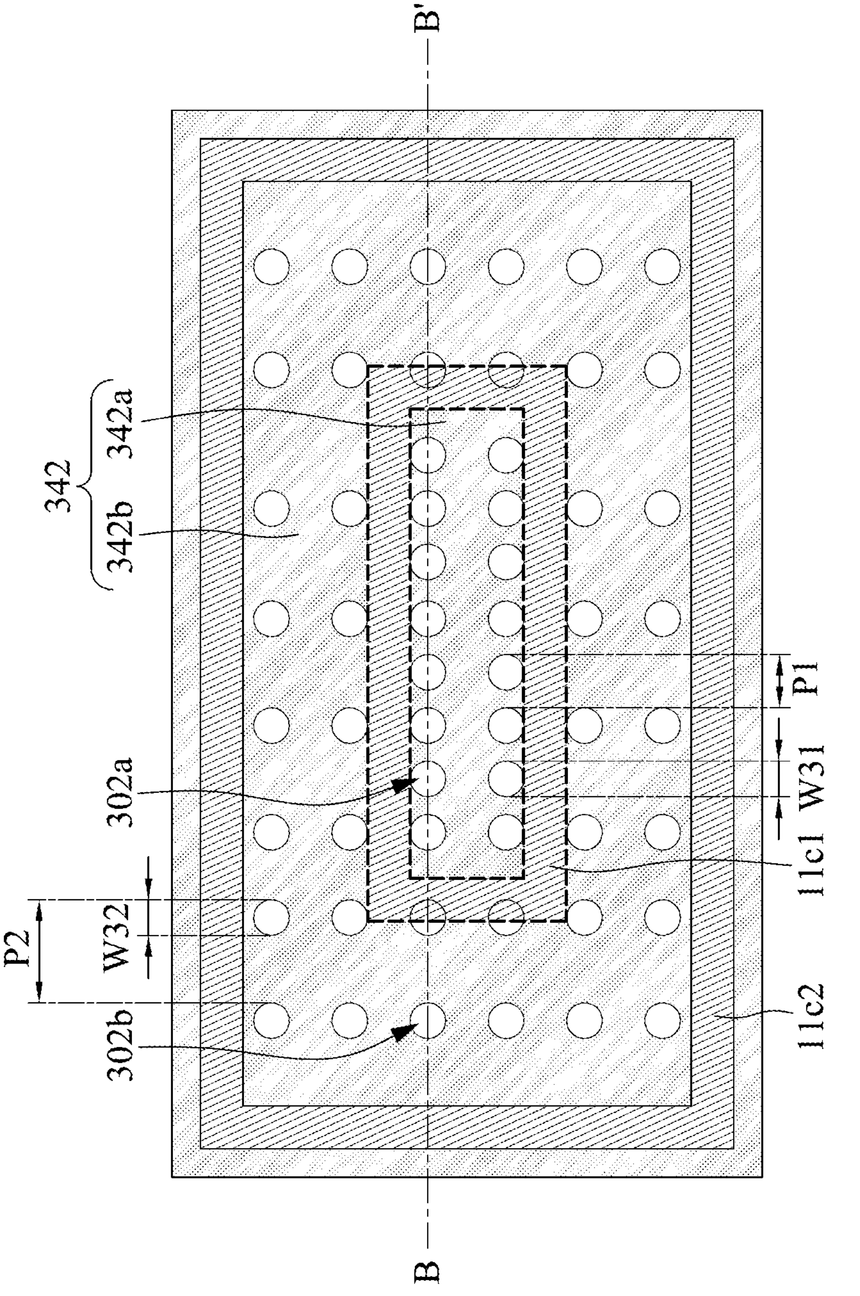
FIG. 8A illustrates a top view of an antenna module according to some embodiments of the present disclosure.

FIG. 8 illustrates a cross-sectional view of an antenna module 200A according to some embodiments of the present disclosure. FIG. 8A illustrates a top view of the antenna module 200A according to some embodiments of the present disclosure. The cross-sectional view of FIG. 8 may be along the line B-B' of FIG. 8A. The antenna module 200A in FIG. 8 is similar to the antenna module 100A in FIG. 1. Therefore, some detailed descriptions may refer to corresponding preceding paragraphs and are not repeated hereinafter for conciseness, with differences therebetween as follows.

The antenna structure 11 of the antenna module 200A may include a dielectric structure (or a single dielectric layer) 34, rather than the multiple dielectric layers 141 and 142 in FIG. 1. The dielectric structure 34 may be disposed over the carrier 10. The dielectric structure 34 may have a surface (or a lower surface) 34*s*1 facing the carrier 10 and a surface (or an upper surface) 34*s*2 opposite to the surface 34*s*1. The dielectric structure 34 may include a portion (or a dielectric layer) 341 and a portion (or a dielectric layer) 342 disposed over the dielectric layer 341. The dielectric layer 341 may have the surface 34*s*1 and the dielectric layer 342 may have the surface 34*s*2. The dielectric layer 341 may be connected to the dielectric layer 342. In some embodiments, the dielectric layers 341 and 342 may be homogeneous. There may be no boundary or interface between the dielectric layers 341 and 342. The dielectric layers 341 and 342 may include the same material. The dielectric layers 341 and 342 may be formed in the same process. In other words, the single dielectric structure 34 can eliminates any mismatch of the coefficient of thermal expansion (CTE), such that the warpage of the antenna module 200A is reduced.

In some embodiments, the dielectric layers 341 and 342 may be formed in a lamination process. A buffer layer or an adhesive layer (not shown) may be disposed between the dielectric layers 341 and 342 and is not shown in FIG. 8 for brevity.

The dielectric structure 34 may further comprise a plurality of openings 301 disposed in the dielectric layer 341. The openings 301 may be empty or void. The openings 301 may be filled with air. The openings 301 may fluidly connected to (or exposed to) an external environment. A portion of the conductive layer 11*c*4 may be exposed by the openings 301. A portion of the surface 101 of the carrier 10 may be exposed by the openings 301. In some embodiments, a portion of the waveguide 13 may be exposed by the openings 301. The openings 301 may each have a sidewall 301*s* extending in a direction substantially perpendicular to the surface 34*s*1 of the dielectric structure 34. The depth of openings 301 may be substantially vertical to the surface 34*s*1 of the dielectric structure 34. The openings 301 may have a set of holes reaching the surface 101 of the carrier 10 and another set of holes reaching the conductive structure 11*c*.

The dielectric structure 34 has a first structurally defined dielectric constant and a second structurally defined dielectric constant different from the first structurally defined dielectric constant. The openings 301 and the dielectric layer 341 collectively define the first structurally defined dielectric constant. The openings 301 and the dielectric layer 341 may be comprised in a hybrid structure HR1 that has the first structurally defined dielectric constant. In some embodiments, the openings 301 may be disposed in the dielectric layer 341, such that the second structurally defined dielectric constant is greater than the first structurally defined dielectric constant. The value of the first structurally defined dielectric constant may depend on the proportion of the elements (e.g., the openings 301 and the dielectric material of the dielectric layer 341) in the hybrid structure HR1. For example, the first structurally defined dielectric constant of the dielectric structure 34 may be defined by a density (or a pattern density) of the openings 301. The first structurally defined dielectric constant of the dielectric structure 34 may be defined by a width of each of the openings 301. The dielectric layer 341 may have the first structurally defined dielectric constant that differs from the original dielectric constant of its dielectric material.

The dielectric structure 34 may further comprise a plurality of openings 302 disposed in the dielectric layer 342. The openings 302 may be empty or void. The openings 302 may be filled with air. The openings 301 may fluidly connected to (or exposed to) an external environment. The openings 302 may extend through the dielectric layer 342. A portion of the conductive layer 11*c*3 may be exposed by the openings 302. The openings 302 may each have a sidewall 302*s* extending in a direction substantially perpendicular to the surface 34*s*1 of the dielectric structure 34. The depth of openings 302 may be substantially vertical to the surface 34*s*1 of the dielectric structure 34.

As shown in FIG. 8A, the openings 302 may have a first group 302*a* in a central part 342*a* of the dielectric layer 342 and a second group 302*b* may be disposed in a peripheral part 342*b* of the dielectric layer 342. The second group 302*b* is disposed at a periphery of the first group 302*a*. The central part 342*a* may be surrounded by the peripheral part 342*b*. The dielectric layer 342 has a cross-sectional area greater than that of the dielectric layer 341. As shown in FIG. 8A, a pitch P1 of the openings 301 is smaller than a pitch P2 of the openings 302.

The openings 302 and the dielectric layer 342 collectively define the second structurally defined dielectric constant. Referring back to FIG. 8, the openings 302 and the dielectric layer 342 may be comprised in a hybrid structure HR2 that has the second structurally defined dielectric constant. The hybrid structure HR2 may be over the hybrid structure HR1. The value of the second structurally defined dielectric constant may depend on the proportion of the elements (e.g., the openings 302 and the dielectric material of the dielectric layer 342) in the hybrid structure HR2. For example, the second structurally defined dielectric constant of the dielectric structure 34 may be defined by a density (or a pattern density) of the openings 302. The second structurally defined dielectric constant of the dielectric structure 34 may be defined by a width of each of the openings 302. The dielectric layer 342 may have the second structurally defined dielectric constant that differs from the original dielectric constant of its dielectric material.

The openings 301 and 302 may be formed by laser or mechanical drilling). In some embodiments, the dielectric structure 34 with the openings 301 and 302 may be formed by a three dimensional printing process. The openings 301 and the first group 302*a* of the openings 302 may be formed integrally. As such, the openings 301 may be connected to the first group 302*a* of the openings 302. There may be no interface between the openings 301 and the first group 302*a* of the openings 302. The openings 301 and the first group 302*a* may be referred to as a plurality of integral openings which have a depth D11 greater than a depth D12 of the openings 302. A width W31 of the openings 301 may be substantially the same as a width W32 of the openings 302. The first group 302*a* of the openings 302 may have a pitch P1 and the second group 302*b* of the openings 302 may have a pitch P2. The pitch of the openings 301 may be the same as the pitch P1 of the first group 302*a* of the openings 302 as they are formed integrally. The density of the openings 301 may be greater than a portion (e.g., the second group 302*b*) of the openings 302 or substantially equal to the density of a portion (e.g., the first group 302*a*) of the openings 302.

The pitch P2 may be larger than the pitch P1. The pattern density of the openings 301 may be greater than that of the openings 302, since the openings 302 have various pitches P1 and P2 and the openings 301 have the relatively small pitch P1. The pattern density of the openings 301 in the hybrid structure HR1 is greater than the pattern density of the openings 302 in the hybrid structure HR2. That is, the proportion of the dielectric material in the hybrid structure HR2 is greater than that in the hybrid structure HR1. In other words, the proportion of the air in the hybrid structure HR2 is smaller than that in the hybrid structure HR1. The equivalent dielectric constant of the hybrid structure HR2 (i.e., the second structurally defined dielectric constant) is greater than the equivalent dielectric constant of the hybrid structure HR1 (i.e., the first structurally defined dielectric constant).

The dielectric structure 34 may include a plurality of mediums (e.g., the dielectric layers 341, 342, and the openings 301, 302) within the conductive structure (or surrounded by the conductive structure). The plurality of mediums may be configured to transmit or carry an electromagnetic wave signal. The plurality of mediums may have at least two dielectric constants. The dielectric structure 34 can be homogeneous in terms of its dielectric material and can have multiple, different structurally defined dielectric constants. The conductive structure 11*c* may define a space 55. The dielectric structure 34 may be at least partially within the space 55. For example, the conductive elements 11*c*1 and 11*c*2 and the conductive layers 11*c*3 and 11*c*4 may define the space 55. The dielectric layers 341 and 342 are at least partially within the space 55. The dielectric layer 341 may be surrounded by the conductive element 11*c*1. The dielectric layer 342 may be surrounded by the conductive element 11*c*2. As shown in FIG. 8, the frequency operation region 111 may include the dielectric layer 341 with the first structurally defined dielectric constant (or the low dielectric constant) and the conductive element 11*c*1. The first structurally defined dielectric constant of the dielectric layer 341 can improve the transmission loss of electromagnetic waves in the frequency operation region 111. The gain of the antenna module 200A can be improved. The frequency operation region 112 may include the dielectric layer 342 with the second structurally defined dielectric constant (or the high dielectric constant) and the conductive element 11*c*2. The second structurally defined dielectric constant of the dielectric layer 342 can increase the equivalent thickness for electromagnetic waves, such that the frequency operation region 112 with a relatively small height can be operated in a relatively low frequency (e.g., relatively large wavelength). The size (e.g., the Z-height) of the antenna module 200A can be relatively small.

In some embodiments, the pattern density of the openings 301 and 302 are designed, such that the rigidity of the antenna module 200A is acceptable.

Figure 8B:
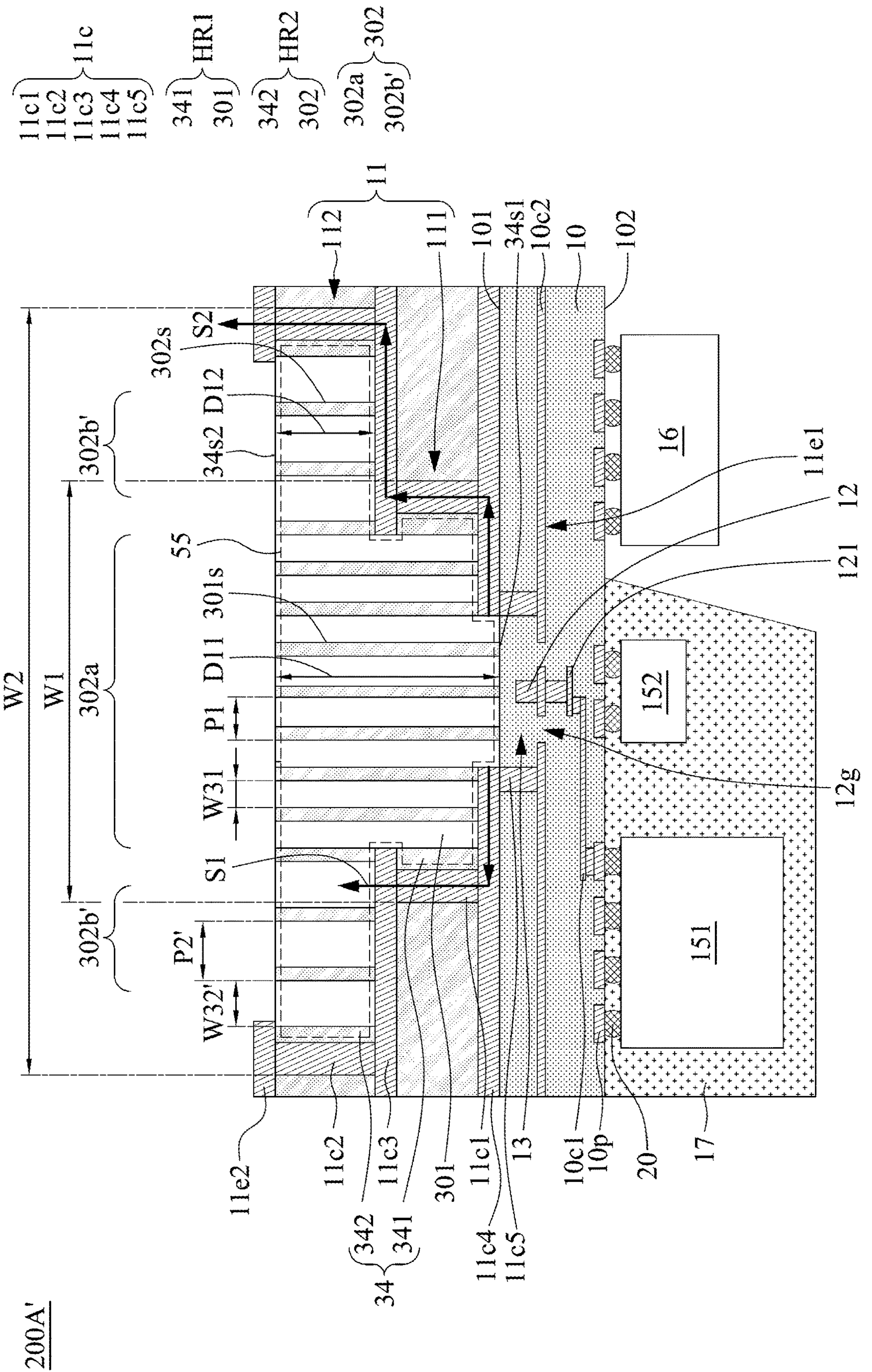
FIG. 8B illustrates a cross-sectional view of an antenna module according to some embodiments of the present disclosure.

FIG. 8B illustrates a cross-sectional view of an antenna module 200A' according to some embodiments of the present disclosure. The antenna module 200A' in FIG. 8B is similar to the antenna module 200A in FIG. 8. Therefore, some detailed descriptions may refer to corresponding preceding paragraphs and are not repeated hereinafter for conciseness, with differences therebetween as follows.

The opening 302 antenna module 200A' may include a second group 302*b*' in the peripheral part of the dielectric layer 342, rather than the second group 302*b* in FIG. 8. The width W31 of the first group 302*a* may be smaller than a width W32' of the second group 302*b*'. The second group 302*b*' may have a pitch P2' larger than the pitch P1 of the openings 301. In some embodiments, the hybrid structure HR2 may include the second group 302*b*'. The value of the second structurally defined dielectric constant may depend on the proportion of the elements (e.g., the openings 302, and the dielectric layer 342) in the hybrid structure HR2. For example, the second structurally defined dielectric constant of the dielectric structure 34 may be defined by the width W31 of the first group 302*a* and the width W32' of the second group 302*b*'. Since the width W32' of the second group 302*b*' is larger than the width W31 of the openings 301, the equivalent dielectric constant of the hybrid structure HR2 (i.e., the second structurally defined dielectric constant) is greater than the equivalent dielectric constant of the hybrid structure HR1 (i.e., the first structurally defined dielectric constant).

The antenna module 200A' may provide at least similar or identical technical effects to those of the antenna module 200A.

Figure 9:
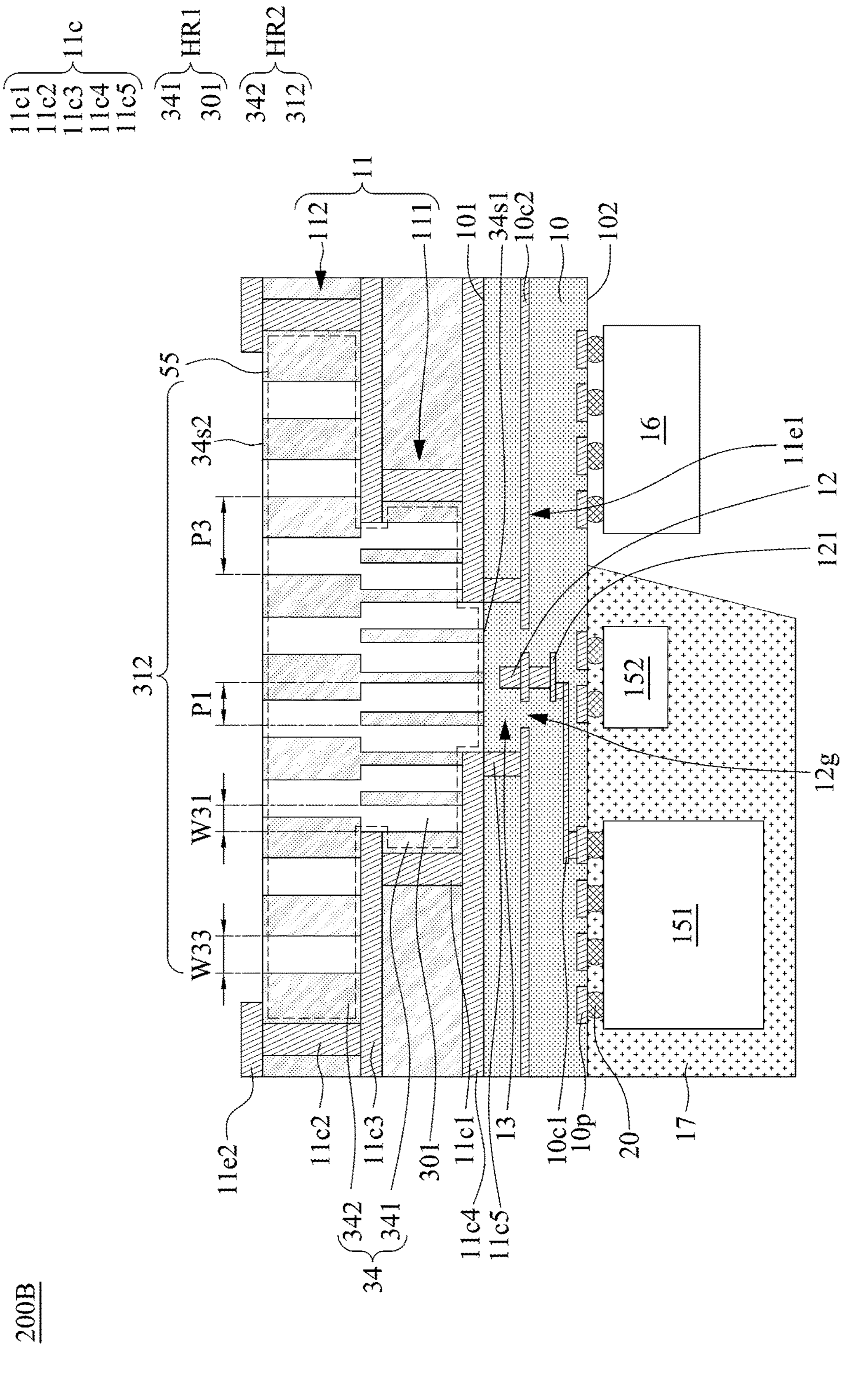
FIG. 9 illustrates a cross-sectional view of an antenna module according to some embodiments of the present disclosure.

FIG. 9 illustrates a cross-sectional view of an antenna module 200B according to some embodiments of the present disclosure. The antenna module 200B in FIG. 9 is similar to the antenna module 200A in FIG. 8. Therefore, some detailed descriptions may refer to corresponding preceding paragraphs and are not repeated hereinafter for conciseness, with differences therebetween as follows.

The antenna module 200B may include a plurality of openings 312 disposed in the dielectric layer 342. The openings 312 may be empty or void. The openings 312 may be filled with air. The openings 312 may be misaligned with the openings 301. The openings 312 may have a width W33 different from the width W31 of the openings 301. The width W33 may be greater than the width W31. The openings 312 may have a pitch P3 different from the pitch P1 of the openings 301. The pitch P1 may be smaller than the pitch P3. Thus, the pattern density of the openings 301 may be greater than that of the openings 312.

The openings 312 may be formed by an etching process (e.g., laser or mechanical drilling). In some embodiments, the dielectric structure 34 with the openings 301, 302, and 312 may be formed by a three dimensional printing process.

In the antenna module 200B, the value of the second structurally defined dielectric constant of the dielectric structure 34 may depend on the proportion of the elements (e.g., the openings 312 and the dielectric material of the dielectric layer 342) in the hybrid structure HR2. For example, the second structurally defined dielectric constant of the dielectric structure 34 may be defined by the pattern density of the openings 312. The second structurally defined dielectric constant of the dielectric structure 34 may be defined by the width W33 of the openings 312.

Since the pattern density of the openings 301 in the hybrid structure HR1 is greater than the combined pattern density of the openings 312 in the hybrid structure HR2, the proportion of the dielectric material in the hybrid structure HR2 is greater than that in the hybrid structure HR1. In other words, the proportion of the air in the hybrid structure HR2 is smaller than that in the hybrid structure HR1. The equivalent dielectric constant of the hybrid structure HR2 (i.e., the second structurally defined dielectric constant) is greater than the equivalent dielectric constant of the hybrid structure HR1 (i.e., the first structurally defined dielectric constant).

The frequency operation region 112 may include the dielectric layer 342 with the second structurally defined dielectric constant (or the high dielectric constant). The second structurally defined dielectric constant of the dielectric layer 342 can increase the equivalent thickness for electromagnetic waves, such that the frequency operation region 112 with a relatively small height can be operated in a relatively low frequency (e.g., relatively large wavelength). The size (e.g., the Z-height) of the antenna module 200B can be relatively small.

Figure 10:
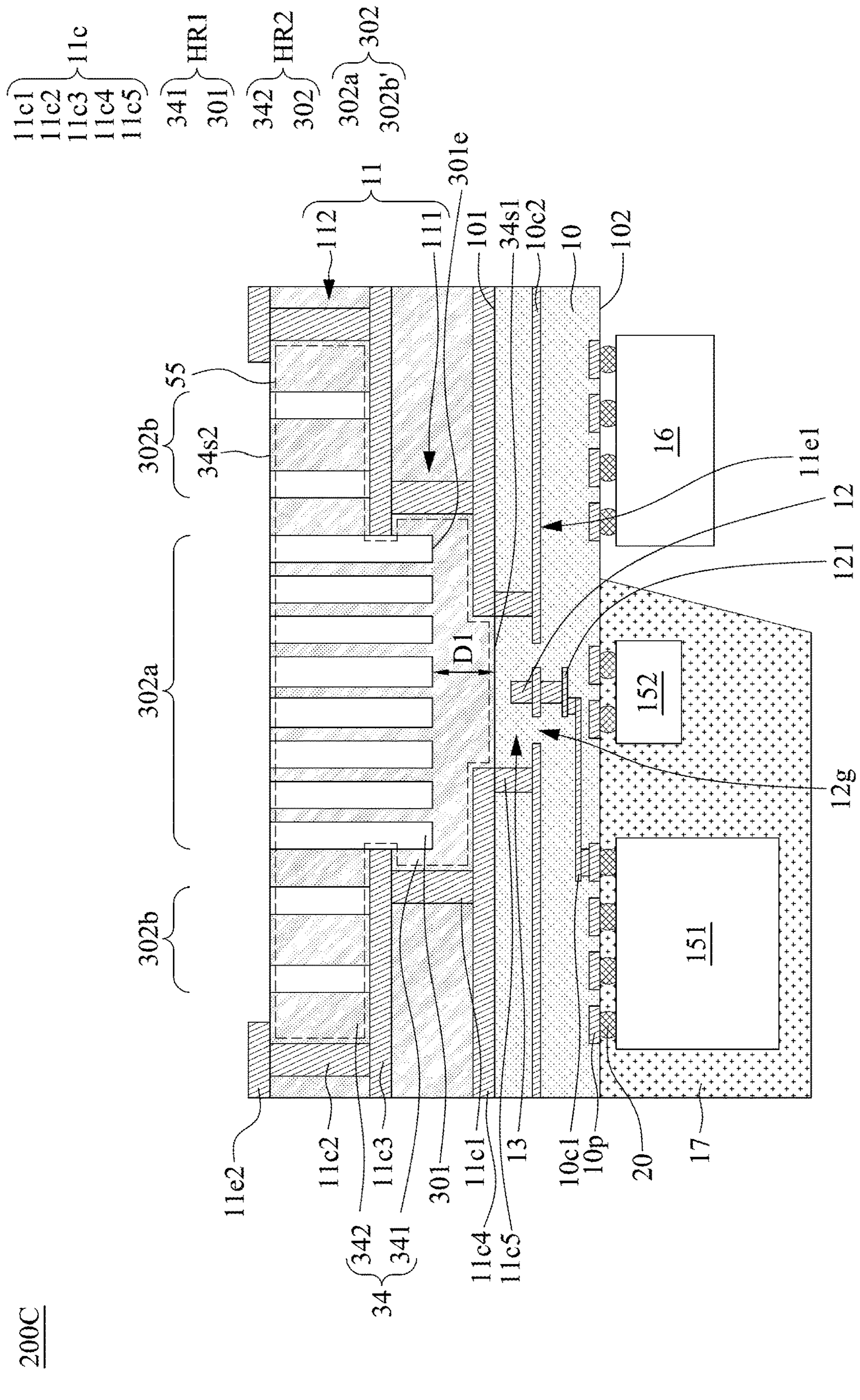
FIG. 10 illustrates a cross-sectional view of an antenna module according to some embodiments of the present disclosure.

FIG. 10 illustrates a cross-sectional view of an antenna module 200C according to some embodiments of the present disclosure. The antenna module 200C in FIG. 10 is similar to the antenna module 200A in FIG. 8. Therefore, some detailed descriptions may refer to corresponding preceding paragraphs and are not repeated hereinafter for conciseness, with differences therebetween as follows.

As shown in FIG. 10, each of the openings 301 has an end 301*e* in the dielectric layer 341. The surface roughness of the end 301*e* is different than that of the surface 34*s*2. The surface roughness of the end 301*e* is greater than that of the surface 34*s*2. The end 301*e* may be spaced apart from the surface 34*s*1 (or the lower surface) of the dielectric layer 341 by a distance D1. The openings 301 may be free from contacting the surface 101 of the carrier 10. The depth of the openings 301 can adjust the first structurally defined dielectric constant. For example, when the depth of the openings 301 is larger (or the end 301*e* is closer to the surface 34*s*1), the first structurally defined dielectric constant may be lower because of the decreased proportion of the dielectric material in the dielectric layer 341.

In some embodiments, the portion of the dielectric layer 341 with no openings may have an additional structurally defined dielectric constant greater than the first structurally defined dielectric constant. Therefore, the frequency operation region 111 may be operated at varied frequencies, thereby increasing the bandwidth of the antenna module 200C.

Figure 11:
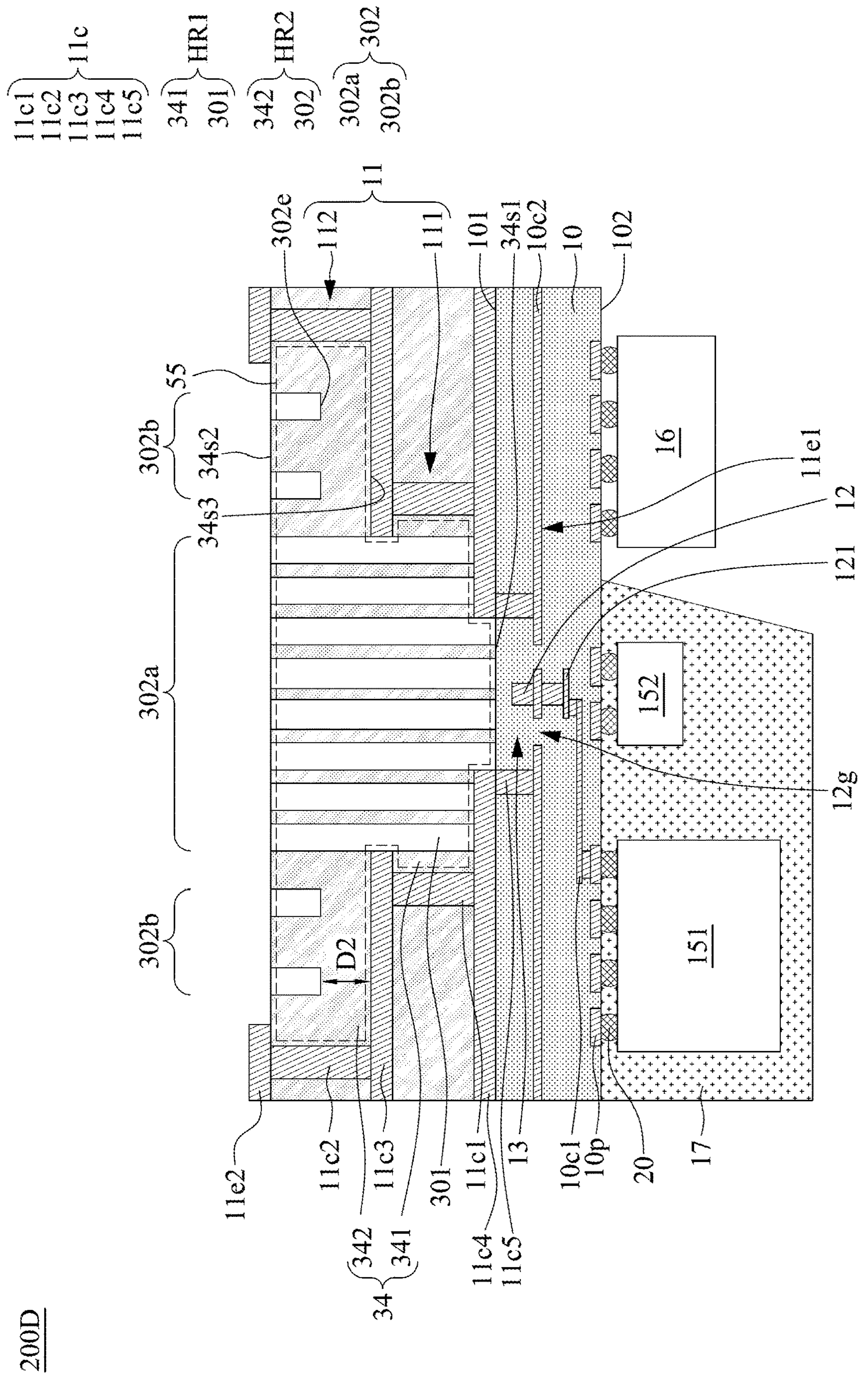
FIG. 11 illustrates a cross-sectional view of an antenna module according to some embodiments of the present disclosure.

FIG. 11 illustrates a cross-sectional view of an antenna module 200D according to some embodiments of the present disclosure. The antenna module 200D in FIG. 11 is similar to the antenna module 200A in FIG. 8. Therefore, some detailed descriptions may refer to corresponding preceding paragraphs and are not repeated hereinafter for conciseness, with differences therebetween as follows.

As shown in FIG. 11, a depth of the first group 302*a* of the openings 302 downward from the upper surface 34*s*2 of the dielectric layer 342 is different from a depth of the second group 302*b* of the openings 302 downward from the upper surface 34*s*2 of the dielectric layer 342. Each of the second groups 302*b* has an end 302*e* in the dielectric layer 342. The surface roughness of the end 302*e* is different than that of the surface 34*s*2. The surface roughness of the end 302*e* is greater than that of the surface 34*s*2. The end 302*e* may be spaced apart from a surface 34*s*3 (or the lower surface) of the dielectric layer 342 by a distance D2. The surface 34*s*3 may be between the surfaces 34*s*1 and 34*s*2. The second group 302*b* of the openings 302 may be free from reaching the conductive layer 11*c*3 of the conductive structure 11*c*. The depth of the second group 302*b* can adjust the second structurally defined dielectric constant. For example, when the depth of the second group 302*b* is larger (or the end 302*e* is closer to the surface 34*s*3), the second structurally defined dielectric constant may be lower because of the decreased proportion of the dielectric material in the dielectric layer 342.

In some embodiments, the portion of the dielectric layer 342 with no openings may have an additional structurally defined dielectric constant greater than the second structurally defined dielectric constant. Therefore, the frequency operation region 112 may be operated at varied frequencies, thereby increasing the bandwidth of the antenna module 200D.

Figure 12:
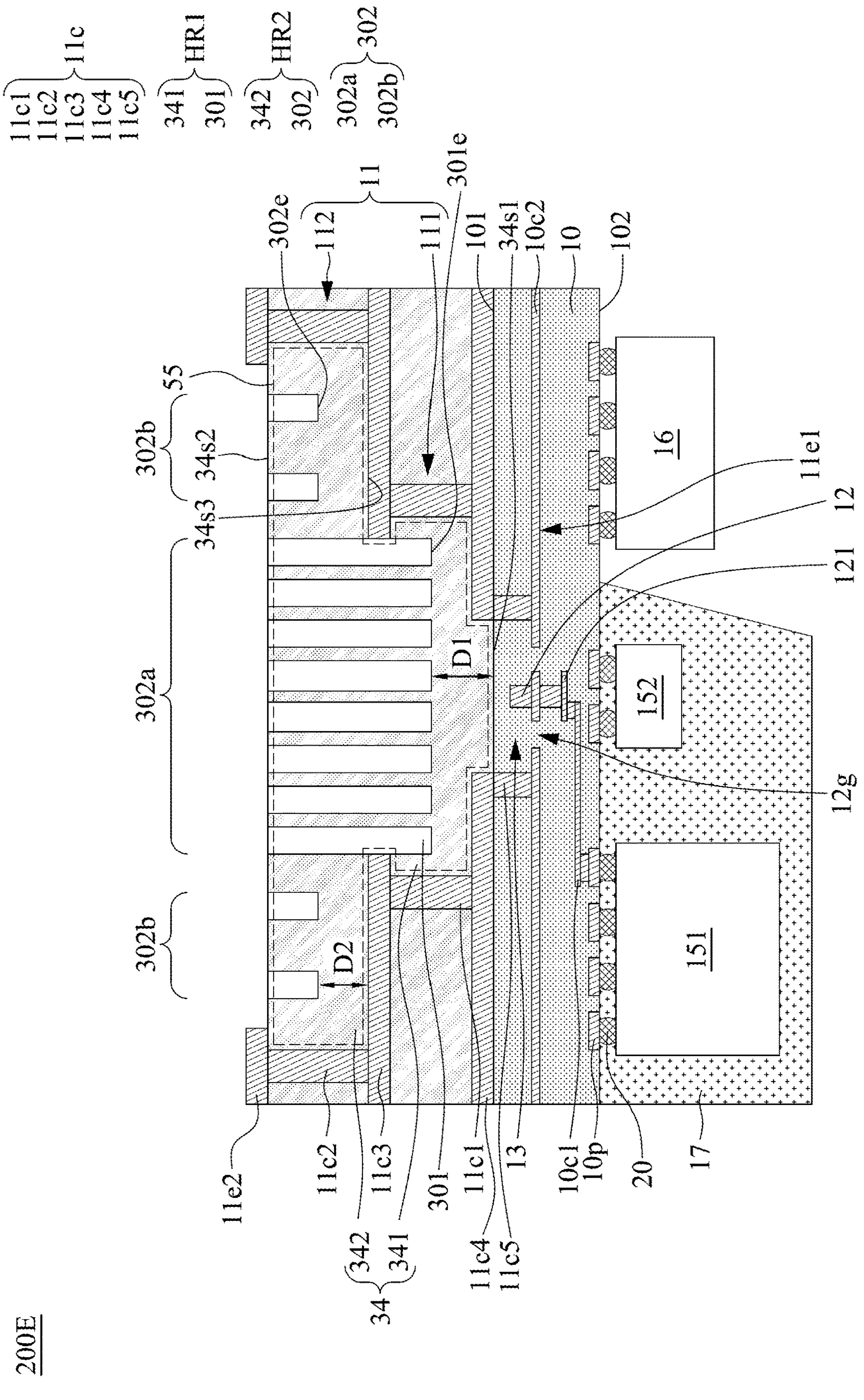
FIG. 12 illustrates a cross-sectional view of an antenna module according to some embodiments of the present disclosure.

FIG. 12 illustrates a cross-sectional view of an antenna module 200E according to some embodiments of the present disclosure. The antenna module 200E in FIG. 12 is similar to the antenna module 200A in FIG. 8. Therefore, some detailed descriptions may refer to corresponding preceding paragraphs and are not repeated hereinafter for conciseness, with differences therebetween as follows.

As shown in FIG. 12, each of the openings 301 has an end 301*e* in the dielectric layer 341. The end 301*e* may be spaced apart from the surface 34*s*1 (or the lower surface) of the dielectric layer 341 by a distance D1. Each of the second group 302*b* of the openings 302 has an end 302*e* in the dielectric layer 342. The end 302*e* may be spaced apart from a surface 34*s*3 (or the lower surface) of the dielectric layer 342 by a distance D2. The surface 34*s*3 may be between the surfaces 34*s*1 and 34*s*2. The depth of the openings 301 and the openings 302 (i.e., the second group 302*b*) can adjust the structurally defined dielectric constants of the dielectric structure 34. In some embodiments, the dielectric structure 34 may have more structurally defined dielectric constants. Therefore, the frequency operation regions 111 and 112 may be operated at varied frequencies, thereby increasing the bandwidth of the antenna module 200E.

Figure 13:
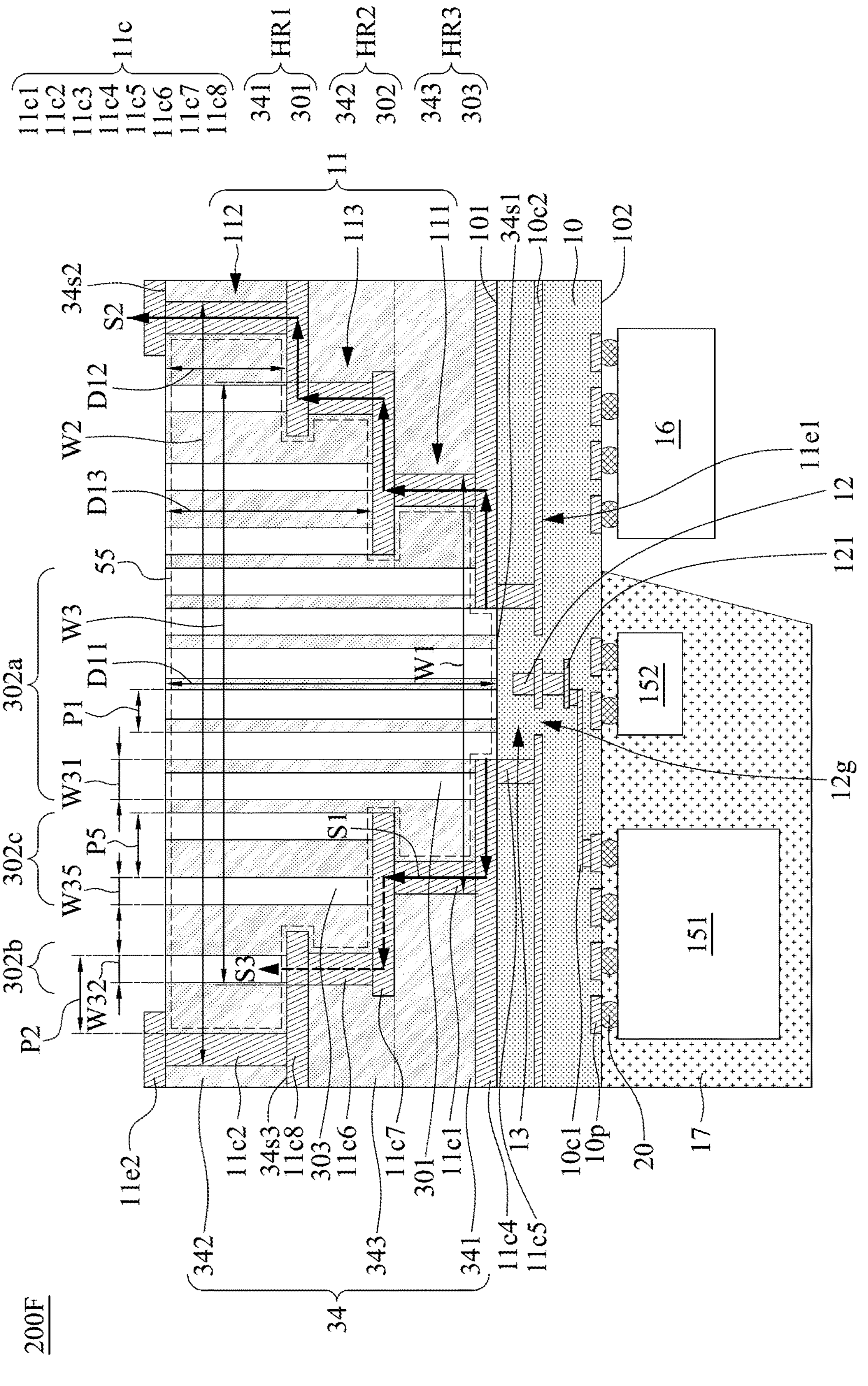
FIG. 13 illustrates a cross-sectional view of an antenna module according to some embodiments of the present disclosure.

FIG. 13 illustrates a cross-sectional view of an antenna module 200F according to some embodiments of the present disclosure. The antenna module 200F in FIG. 13 is similar to the antenna module 200A in FIG. 8. Therefore, some detailed descriptions may refer to corresponding preceding paragraphs and are not repeated hereinafter for conciseness, with differences therebetween as follows.

The conductive structure 11*c* may include a conductive layers 11*c*7 and 11*c*8, and a conductive element 11*c*6. The conductive element 11*c*6 is substantially perpendicular to the surface 101 of the carrier 10. The conductive layers 11*c*8 and 11*c*7 are substantially parallel to the surface 101 of the carrier 10. The conductive layer 11*c*8 electrically connects the conductive element 11*c*6 with the conductive element 11*c*2. The conductive layer 11*c*7 electrically connects the conductive element 11*c*6 with the conductive element 11*c*1. The conductive layers 11*c*7 and 11*c*8, and the conductive element 11*c*6 are covered or encapsulated by the dielectric structure 34.

The conductive elements 11*c*1, 11*c*2, and 11*c*6 and the conductive layers 11*c*3, 11*c*4, 11*c*7, and 11*c*8 may define the space 55. The dielectric layers 341, 342, 343 are at least partially within the space 55. The conductive layers 11*c*3, 11*c*4, 11*c*7, and 11*c*8 and the conductive elements 11*c*1, 11*c*2, and 11*c*6 may define a plurality of steps around the space 55 in a cross-sectional view. In some embodiments, the conductive element 11*c*6 may be applied with a constant voltage or connected to the ground through the conductive layer 10*c*2.

The dielectric structure 34 may further include a dielectric layer (or a portion) 343 disposed between the dielectric layers 341 and 342. The dielectric layer 343 may be connected to the dielectric layers 341 and 342. The dielectric layer 143 may have a third dielectric constant greater than the first dielectric constant and smaller than the second dielectric constant. The dielectric layers 341, 342, and 343 may be formed in a lamination process. In some embodiments, the dielectric layers 341, 342, and 343 may be homogeneous. There may be no boundary or interface between the dielectric layers 341, 342, and 343. The dashed line is presented for explaining the location of each of the dielectric layers 341, 342, and 343. The dielectric layers 341, 342, and 343 may include the same material. The dielectric layers 341, 342, and 343 may be formed in the same process. In other words, the single dielectric structure 34 can eliminate any mismatch of the coefficient of thermal expansion (CTE), such that the warpage of the antenna module 200F is reduced.

In some embodiments, the dielectric layers 341, 342, and 343 may be formed in a lamination process. A buffer layer or an adhesive layer (not shown) may be disposed between the dielectric layers 341, 342, and 343 and is not shown in FIG. 13 for brevity.

The antenna module 200F may further include a plurality of openings 303 disposed between the openings 301 and 302. The openings 323 may be empty or void. The openings 303 may be filled with air. In some embodiments, the openings 303 may be disposed in the dielectric layer 343.

The openings 303 and the dielectric layer 343 may be comprised in a hybrid structure HR3 that has a third structurally defined dielectric constant. In other words, the dielectric structure 34 may have the third structurally defined dielectric constant. The hybrid structure HR3 may be disposed between the hybrid structures HR1 and HR2. The value of the third structurally defined dielectric constant may depend on the proportion of the elements (e.g., the openings 303 and the dielectric material of the dielectric layer 342) in the hybrid structure HR2. For example, the third structurally defined dielectric constant of the dielectric structure 34 may be defined by a density (or a pattern density) of the openings 303. The third structurally defined dielectric constant of the dielectric structure 34 may be defined by a width of each of the openings 303. The dielectric layer 343 may have the third structurally defined dielectric constant that differs from the original dielectric constant of its dielectric material.

The openings 303 may be formed by laser or mechanical drilling). In some embodiments, the dielectric structure 34 with the openings 301, 302, and 303 may be formed by a three dimensional printing process. The openings 303 and the first group 301*a* and the third group 302*c* of the openings 302 may be formed integrally. As such, the openings 303 may be connected to the first group 301*a* and the third group 302*c* of the openings 302. There may be no interface between the openings 303 and the first group 301*a* and the third group 302*c* of the openings 302. A portion of the openings 303 and the third group 302*c* may be referred to as a plurality of integral openings which have a depth D13 greater than the depth D12 of the openings 302 and smaller than the depth D11 of the openings 301. A width W35 of the openings 303 may be substantially the same as the width W31 of the openings 301 and the width W32 of the openings 302. The third group 302*c* of the openings 302 may have a pitch P5. The pitch P5 may be greater than the pitch P1 and smaller than the pitch P2. The pitch of a portion of the openings 303 may be the same as the pitch P5 of the third group 302*c* of the openings 302 and another portion of the openings 303 may be the same as the pitch P1 of the first group 302*a* of the openings 302. The combined pitch of the openings 303 may be greater than the pitch P1 and smaller than the pitch P2.

The pattern density of the openings 303 may be greater than the openings 302 and smaller than the openings 301. That is, the proportion of the dielectric material in the hybrid structure HR3 is between those in the hybrid structures HR1 and HR2. In other words, the proportion of the air in the hybrid structure HR3 is between those in the hybrid structures HR1 and HR2. The equivalent dielectric constant of the hybrid structure HR3 (i.e., the third structurally defined dielectric constant) is between the equivalent dielectric constant of the hybrid structures HR1 and HR2 (i.e., the first and second structurally defined dielectric constants).

The conductive element 11*c*6 may define a third space 53. The dielectric layer 343 is at least partially within the third space 53. The dielectric layer 343 may be surrounded by the conductive element 11*c*6. The antenna structure 11 of the antenna module 200F may further include a region (or a frequency operation region) 113 disposed between the frequency operation regions 111 and 112. The frequency operation region 113 may include the dielectric layer 343 with the third structurally defined dielectric constant (or the medium dielectric constant) and the conductive element 11*c*6. A signal S3 (e.g., an electromagnetic wave) with a frequency between the signals S1 and S2 respectively transmitted by the frequency operation regions 111 and 112 may be radiated by the frequency operation region 113 with the width W3. The frequency operation region 113 may be referred to as a medium frequency operation region.

The antenna structure 11 of antenna module 200F may include more frequency operation regions, e.g., more than 3. Each of the multiple frequency operation regions may operate at a different frequency. With the additional frequency operation region 113, the antenna module 200F may operate over a wider range of frequencies, resulting in a broader bandwidth.

Figure 14:
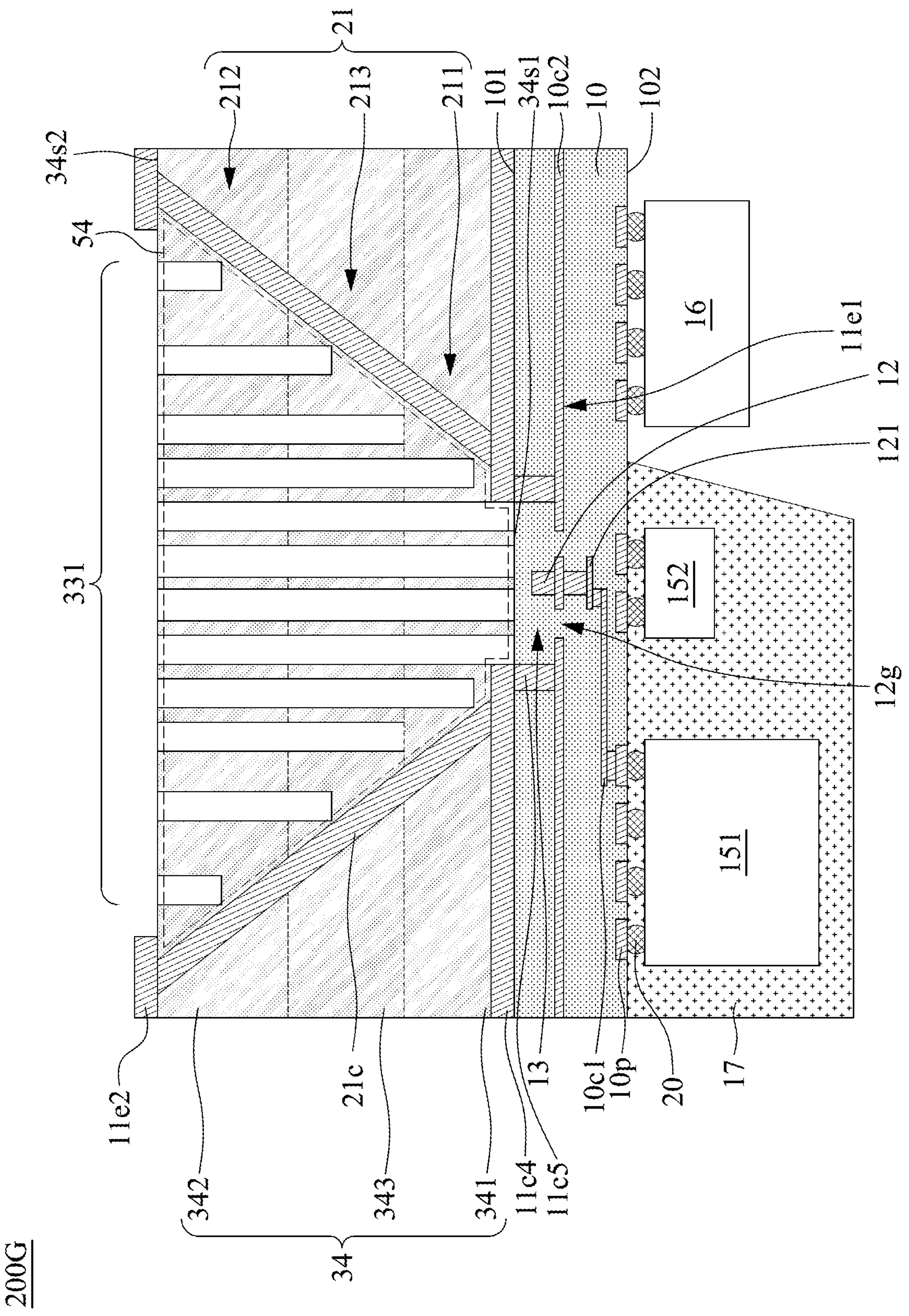
FIG. 14 illustrates a cross-sectional view of an antenna module according to some embodiments of the present disclosure.

FIG. 14 illustrates a cross-sectional view of an antenna module 200G according to some embodiments of the present disclosure. The antenna module 200G in FIG. 14 is similar to the antenna module 200F in FIG. 13. Therefore, some detailed descriptions may refer to corresponding preceding paragraphs and are not repeated hereinafter for conciseness, with differences therebetween as follows.

The antenna module 200G may include an antenna structure 21. The antenna structure 21 may include a conductive structure 21*c*. The conductive structure 21*c* may define a space 54. The dielectric structure 34 may be at least partially within the space 54.

The conductive structure 21*c* may be a single conductive structure. The conductive structure 21*c* may have a taper profile in a cross-sectional view. The antenna structure 21 may be tapered toward the carrier 10. The antenna structure 21 may include the dielectric layers 341, 342, and 343. The dielectric layers 341, 342, and 343 may be surrounded by the conductive structure 21*c*.

The antenna module 200G may include a plurality of openings 331 disposed in the dielectric structure 34. The openings 331 may have varied depths. The taper profile of the conductive structure 21*c* may define the depths of the openings 331. For example, the depths of the openings 331 may increase inwardly. In some embodiments, the openings 331 may have varied pattern densities that increase inwardly. The pattern density of the openings 331 in the dielectric layer 341 may be greater than that in the dielectric layer 343. The pattern density of the openings 331 in the dielectric layer 343 may be greater than that in the dielectric layer 342. Therefore, the dielectric layer 341, 342, 343 may have its own structurally defined dielectric constant.

The antenna structure 21 may include a plurality of frequency operation regions 211, 212, and 213. The frequency operation region 212 may be over the frequency operation regions 211 and 213. The frequency operation region 213 may be between the frequency operation regions 211 and 212. Each of the frequency operation regions 211, 212, and 213 may include a portion of the conductive structure 21*c*. The frequency operation regions 211, 212, and 213 may include the dielectric layers 341, 342, and 343, respectively. The frequency operation regions 211, 212, and 213 may be referred to as high, low, and medium frequency operation regions, respectively.

Each of the frequency operation regions 211, 212, and 213 may have varied widths and may be able to operate at varied frequencies. The antenna module 200G may operate over a wider range of frequencies, resulting in a broader bandwidth. The antenna module 200G may provide at least similar or identical technical effects to those of the antenna modules 200A and 200F.

The openings 331 may be formed by an etching process (e.g., laser or mechanical drilling). In some embodiments, the dielectric structure 34 with the openings 331 may be formed by a three dimensional printing process.

Figure 15:
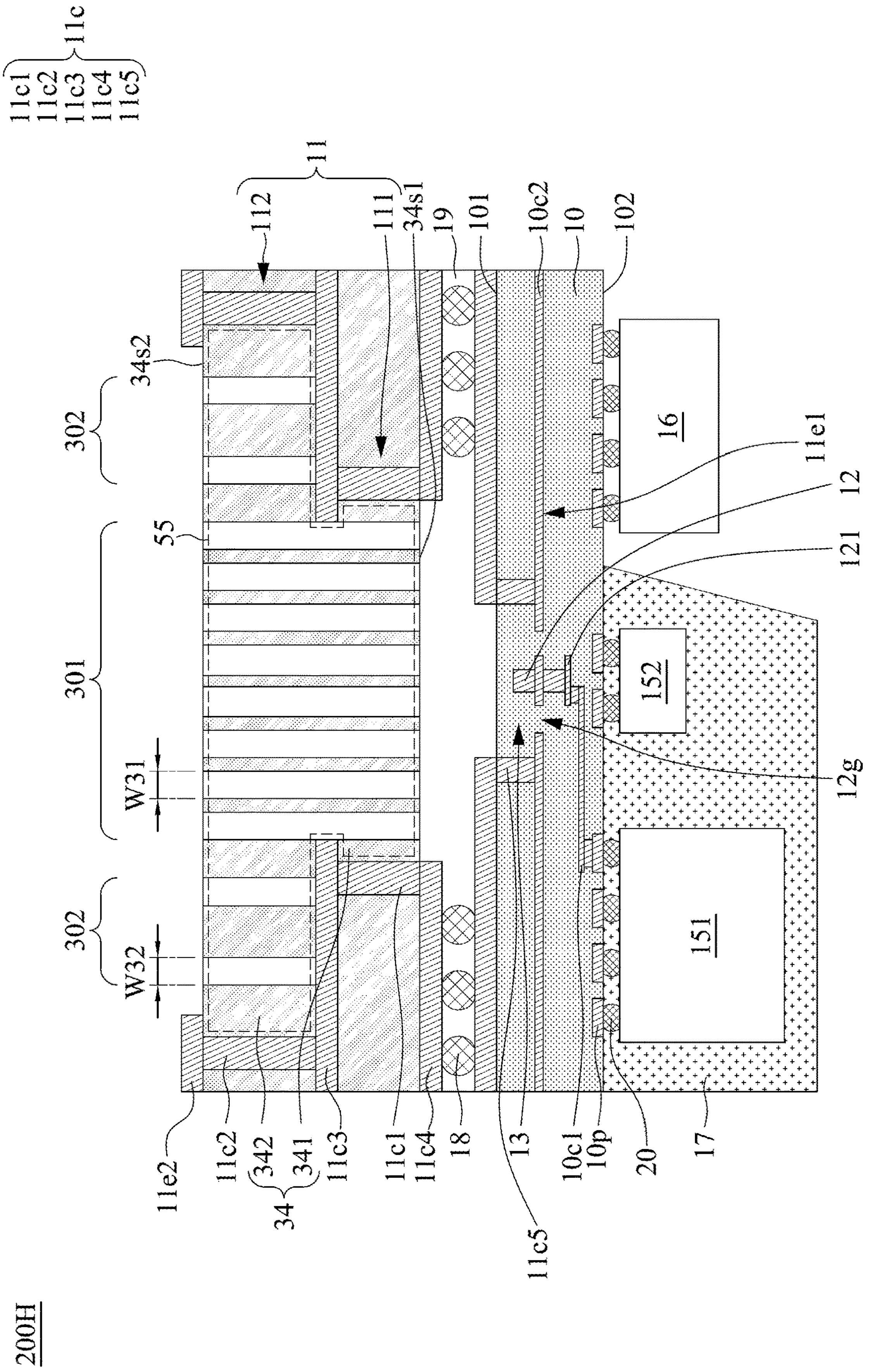
FIG. 15 illustrates a cross-sectional view of an antenna module according to some embodiments of the present disclosure.

FIG. 15 illustrates a cross-sectional view of an antenna module 200H according to some embodiments of the present disclosure. The antenna module 200H in FIG. 15 is similar to the antenna module 200A in FIG. 8. Therefore, some detailed descriptions may refer to corresponding preceding paragraphs and are not repeated hereinafter for conciseness, with differences therebetween as follows.

The antenna module 200H may further include a plurality of connection elements 18 disposed between the antenna structure 11 and the carrier 10. The antenna structure 11 (or the conductive structure 11*c*) may be electrically connected to the conductive layer 10*c*2 of the carrier 10 through the connection elements 18. The antenna module 200H may further include an encapsulant 19 encapsulating the connection elements 18. The encapsulant 19 may be disposed between the antenna structure 11 and the carrier 10. The encapsulant 19 may be in contact with the dielectric layer 341. The encapsulant 19 may include an underfill. The encapsulant 19 may be material that has a dielectric constant that smaller than that of the dielectric layer 341. An incident angle of a wave (e.g., an electromagnetic wave) from the dielectric layer 341 at the surface 34*s*2 is different from a refraction angle of the wave at the surface 34*s*2. The refraction angle of the wave is smaller than the incident angle, such that the energy of the wave in the encapsulant 19 is concentrated.

In some embodiments, the connection elements 18 may include solder balls, controlled collapse chip connection (C4) bumps, a ball grid array (BGA), or a land grid array (LGA). In some embodiments, the encapsulant 19 may include an epoxy resin including fillers, a molding compound (e.g., an epoxy molding compound or another molding compound), polyimide, a phenolic compound or material, a material including silicone dispersed therein, or a combination thereof.

Figure 16:
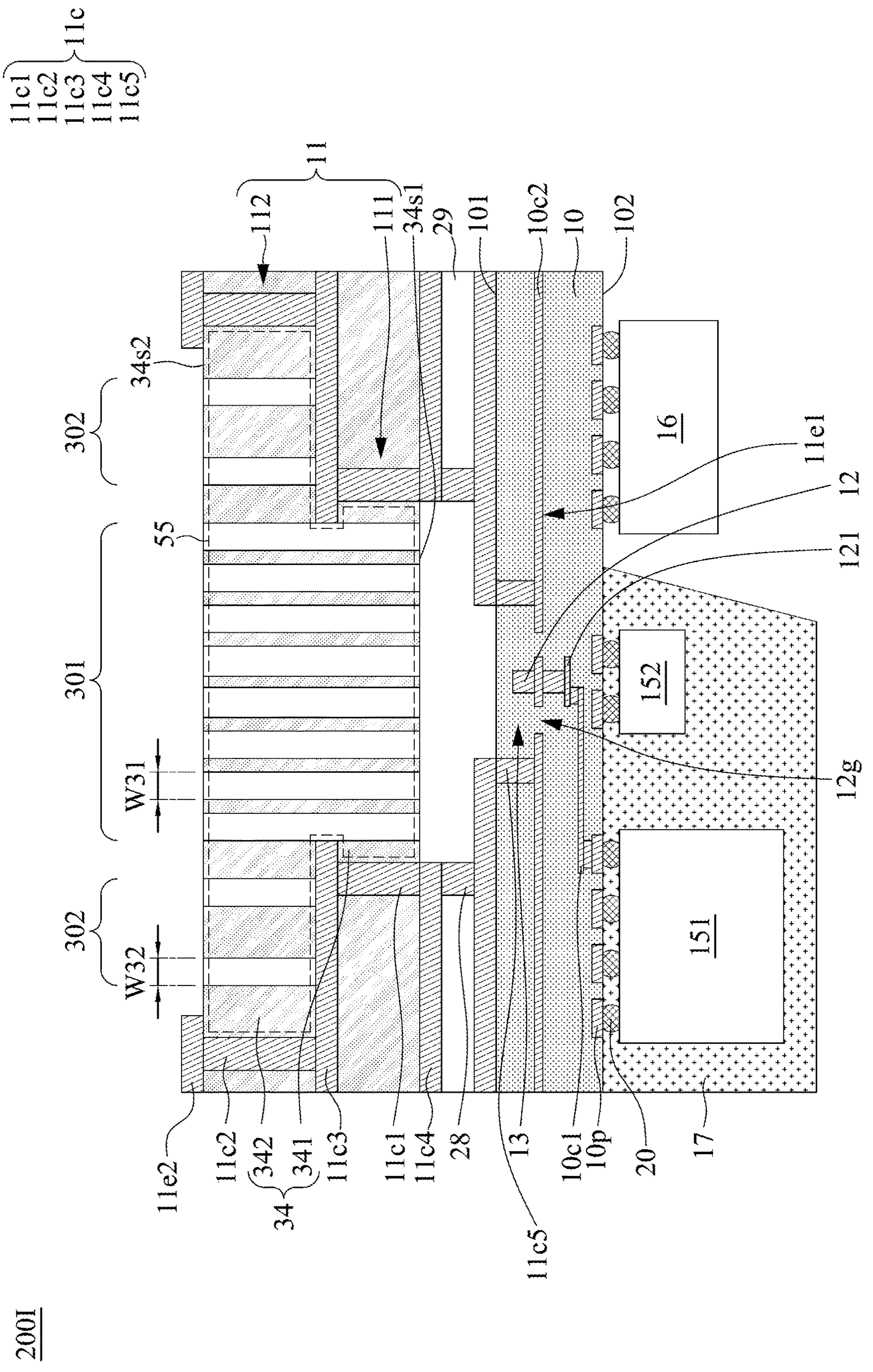
FIG. 16 illustrates a cross-sectional view of an antenna module according to some embodiments of the present disclosure.

FIG. 16 illustrates a cross-sectional view of an antenna module 200I according to some embodiments of the present disclosure. The antenna module 200I in FIG. 6 is similar to the antenna module 200A in FIG. 8. Therefore, some detailed descriptions may refer to corresponding preceding paragraphs and are not repeated hereinafter for conciseness, with differences therebetween as follows.

The antenna module 200I may further include a plurality of conductive pillars 28 and an adhesive layer 29 disposed between the antenna structure 11 and the carrier 10. The antenna structure 11 (or the conductive structure 11*c*) may be electrically connected to the conductive layer 10*c*2 of the carrier 10 through the conductive pillars 28. The adhesive layer 29 may enclose the conductive pillars 28. The adhesive layer 29 may be in contact with the dielectric layer 341.

In some embodiments, the conductive pillars 28 may be formed of metal or a metal alloy. The conductive pillars 28 may include metal, such as copper, gold, silver, aluminum, titanium, tantalum, or the like. The adhesive layer 29 may be electrically isolated but thermally conductive. In some embodiments, the adhesive layer 29 may include silicone, wax, polymer, metal, or other suitable materials.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An antenna module, comprising:

a conductive structure defining a first space and a second space over the first space;

a first hybrid structure at least partially within the first space and having a first dielectric constant;

a second hybrid structure at least partially within the second space and having a second dielectric constant different from the first dielectric constant;

a first region comprising the first hybrid structure and a first conductive element of the conductive structure and configured to operate in first frequency; and a second region comprising the second hybrid structure and a second conductive element of the conductive structure and configured to operate in second frequency different from the first frequency.

2. The antenna module of claim 1, wherein the second hybrid structure comprises a plurality of openings, wherein the openings have a first set of the openings in a central part of the second hybrid structure and a second set of the openings in a peripheral part of the second hybrid structure, and wherein a pattern density of the first set of the openings is greater than that of the second set of the openings.

3. The antenna module of claim 1, wherein the second region has a width greater than that of the first region.

4. The antenna module of claim 1, wherein the conductive structure defines a waveguide, and the first space is disposed between the waveguide and the second space.

5. The antenna module of claim 1, wherein the conductive structure includes a plurality of conductive layers and a plurality of conductive elements through the first hybrid structure and the second hybrid structure.

6. The antenna module of claim 5, wherein the plurality of conductive layers and the plurality of conductive elements define a plurality of steps around the first space and the second space in a cross-sectional view.

7. The antenna module of claim 1, further comprising a third hybrid structure disposed between the first hybrid structure and the second hybrid structure, wherein the third hybrid structure has a third dielectric constant greater than the first dielectric constant and smaller than the second dielectric constant.

8. The antenna module of claim 7, further comprising a third region comprising the third hybrid structure and a third conductive element of the conductive structure and configured to operate in a third frequency between the first frequency and the second frequency.

9. The antenna module of claim 1, further comprising:

a redistribution structure supporting the conductive structure;

an electronic component separated from the conductive structure by the redistribution structure, wherein the redistribution structure comprise a feeding element disposed below the first hybrid structure, and wherein the conductive structure comprises a first end, and a second end opposite to the first end, wherein the first end is disposed below the first conductive element, and the second end is disposed above the second conductive element.

* * * * *